(12) United States Patent
Dalton et al.

(10) Patent No.: US 6,577,265 B2
(45) Date of Patent: Jun. 10, 2003

(54) MULTI-STAGE PROCESSING FOR EFFICIENT AND ACCURATE SPECTRAL MOMENT ESTIMATION

(75) Inventors: Shelly D. Dalton, Golden, CO (US); Lawrence B. Cornman, Longmont, CO (US); Robert K. Goodrich, Boulder, CO (US); Nathaniel Beagley, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 10/043,030

(22) Filed: Jan. 9, 2002

(65) Prior Publication Data

US 2002/0126039 A1 Sep. 12, 2002

Related U.S. Application Data

(60) Provisional application No. 60/260,792, filed on Jan. 10, 2001.

(51) Int. Cl.[7] .............................................. G01S 13/00
(52) U.S. Cl. ..................... 342/26; 342/192; 342/195; 342/196; 342/193
(58) Field of Search .................... 342/26, 192, 193, 342/195, 196

(56) References Cited

U.S. PATENT DOCUMENTS

| | | | | |
|---|---|---|---|---|
| 5,394,155 A | * | 2/1995 | Rubin et al. | 342/192 |
| 5,451,961 A | * | 9/1995 | Rubin et al. | 342/159 |
| 5,563,604 A | | 10/1996 | Brandao et al. | 342/159 |
| 5,568,151 A | * | 10/1996 | Merritt | 342/192 |
| 5,940,523 A | * | 8/1999 | Cornman et al. | 382/100 |
| 6,448,923 B1 | * | 9/2002 | Zrnic et al. | 342/26 |
| 6,307,500 B1 | * | 10/2002 | Cornman et al. | 342/26 |
| 2002/0012289 A1 | * | 1/2002 | Gilbert et al. | 367/135 |
| 2002/0126039 A1 | * | 9/2002 | Dalton et al. | 342/26 |

OTHER PUBLICATIONS

Cornman, Larry, et al., "A Fuzzy Logic Method for Improved Moment Estimation from Doppler Spectra," Journal of Atmospheric and Oceanic Technology, vol. 15, No. 6, Dec. 1998, American Meteorological Society.

Rummler, W. D., "Introduction of a New Estimator for Velocity Spectral Parameters," Bell Telephone Laboratories, Apr. 3, 1968.

Hildebrand, Peter H., "Objective Determination of the Noise Level in Doppler Spectra," Journal of Applied Meteorology, vol. 13 Dept. of the Geophysical Sciences, The University of Chicago, (Manuscript received Oct. 4, 1973, in revised form Jun. 14, 1974).

Urkowitz, Harry, "Obtaining Spectral Moments by Discrete Fourier Transform with Noise Removal in Radar Meteorology," IGARSS 92. Int'l Geosc. & Remote Sens. Symp., Houston, TX, May 1992.

* cited by examiner

Primary Examiner—John B. Sotomayor

(57) ABSTRACT

A multi-stage processing system receives data from signals that indicate information related to scatterers, such as signals from a Doppler scanning system. The multi-stage processing system tracks allowed processing time for the data. The multi-stage processing system performs a first stage of processing for the data to generate first estimates of spectral moments for the signals. The multi-stage processing system performs additional stages of processing for the data as the allowed processing time permits and stops the additional stages of processing for the data when the allowed processing time expires. The additional stages of processing may comprise generating second estimates for at least some of the spectral moments. The additional stages of processing may use methods having increasing complexity and accuracy.

45 Claims, 20 Drawing Sheets

MULTI-STAGE PROCESSING FOR EFFICIENT AND ACCURATE SPECTRAL MOMENT ESTIMATION

RELATED CASES

This patent application claims the benefit of patent application No. 60/260,792. Patent application No. 60/260,792 is hereby incorporated by reference into this patent application.

BACKGROUND OF THE INVENTION

1. Field of the Invention

The invention relates to the processing of data from signals that indicate information related to scatterers, such as signals from a Doppler scanning system, and in particular, to multi-stage processing that estimates the spectral moments of the scatterers enabling an effective trade-off between processing resources and accuracy.

2. Statement of the Problem

Doppler systems detect weather phenomena by reflecting signals off of rain, snow, dust, and debris carried by the wind. In a Doppler radar system, a transmitter emits a series of pulses that are scattered by these materials (scatterers). Some of the energy in the scattered pulses is reflected to a receiver. For a given pointing direction (azimuth and elevation), these pulses are sampled by the receiver as a function of time. Due to the propagation of the transmitted pulses, the time-sampling gives information as a function of range from the receiver. Often times, the transmitter is rotated, so that the continuous set of pulses also gives information as a function of the rotation angle. Typically, radars rotate around a vertical axes (conical, or azimuthal scanning) or along a plane perpendicular to the ground (scanning in elevation). Thus, Doppler systems obtain data that indicates the presence and motion of scatterers at various ranges and angles from the receiver. Doppler systems process this data to estimate the moments (i.e. the first three moments of the Doppler spectrum). The zeroth Doppler moment is related to the average intensity of the reflected energy of the scatterers. The first Doppler moment is related to the reflectivity-weighted velocity of the scatterers toward or away from the receiver (radial velocity). The second Doppler moment is related to the reflectivity-weighted variance of the relative motion of the scatterers. In this manner, Doppler systems are able to estimate wind patterns to aide in the detection of phenomena such as severe storms, tornadoes and turbulence.

Ideally, Doppler systems would only receive reflected energy that is associated with weather phenomenon, but unfortunately, Doppler systems also receive reflections from birds, insects, ground clutter, and other contaminants. To complicate the situation, Doppler systems are also affected by many types of spurious signals. Additional processing is required if atmospheric signals are to be effectively analyzed without corruption from contaminants.

Another problem faced by Doppler systems is the production of quality weather data in a timely manner. For phenomena such as severe storms and tornadoes, real time detection is essential. Doppler scanning at multiple azimuths and ranges generates a huge volume of data that can be contaminated by spurious reflections and signals. Typical real-time Doppler processing systems are simplistic and prone to errors in the presence of contamination. Existing Doppler processing systems that are sophisticated enough to eliminate these errors are too slow to handle real-time operation with vast quantities of data.

Another challenge faced by Doppler systems is the production of confidence values for the output data. The confidence values indicate a probability that the output data (e.g., the Doppler moments) is accurate. Systems that process the output data may use the confidence values to discount or ignore potentially inaccurate data. Currently, fast Doppler processing systems may weed-out some bad data based on signal-to-noise (SNR) thresholds, but these systems do not have the processing time or capacity to provide effective confidence values. Furthermore, this use of strict thresholding only provides for a binary (good/bad) indicator of the data quality. Currently, sophisticated Doppler systems that provide confidence values for their outputs are too slow to handle real-time operation with vast quantities of data.

Detailed Discussion of the Problem—FIGS. 1–5

A problem for the Doppler system is the generation of accurate moments in real-time. The large volume of data produced when scanning Doppler measurement devices are used in applications, such as turbulence sensing and warning, and weather analysis, precludes the use of the accurate real-time processing of moments by highly sophisticated moment estimation methods. The typical real-time methods for processing of scanning radar and lidar data for meteorological applications are fast, but inaccurate at low signal-to-noise ratio (SNR) or in the presence of clutter, radio frequency interference (RFI) and other contaminants.

Radars and lidars use a transmitter and receiver to measure the radial motion of scatterers within the radar/lidar pulse volumes. The transmitter sends out a series of pulses in a given direction. A Fourier transform is applied to the complex time series of received amplitudes and phases for a given range to produce a Doppler spectrum for that range (see FIG. 1). The spectra give information regarding the return power as a function of Doppler frequency. These frequencies are directly related to the Doppler radial velocities. As the device scans, a sequence of Doppler spectra is generated. The term "range gate" will be used to describe the range and pointing direction. In the following and without any loss of generality, it will be assumed that the radar is scanning in azimuth. FIG. 2 shows a contour plot of Doppler spectra before processing for each range gate in a single pointing direction (azimuth).

Let the portion of the spectrum that is primarily influenced by the scatterers of interest (e.g., return from atmospheric scatterers), be referred to as the "signal." If all of the scatterers were identical and moved at the same radial velocity, then the spectra would have significant amplitude only at the frequency that corresponds to that radial velocity. The amplitude of the signal would be proportional to the size and number of scatterers in the pulse interaction volume, the shape of this volume, and the transmitted power from the Doppler measurement device. If the scatterers have more than one velocity, the signal broadens. Theoretically, this broadened signal takes the form of a Gaussian shaped spectra, as is shown in FIG. 3. The width of the signal is proportional to the variance in radial velocities in the pulse volume, which in turn, is indicative of turbulence. The width of the signal can be measured using either the second moment of the Doppler spectrum or the width of a Gaussian fit to the signal. The first moment or the center of a Gaussian fit can be used to measure the mean velocity of the scatterers. The signal power is proportional to the size and distribution of the scatterers in the pulse volume, and is given by the area of the Gaussian, or the zeroth moment.

For actual signals, the velocity mean and width are not always easy to calculate. The Doppler measurement systems have noise associated with the measurements, which contaminates the spectrum and may cause the signal to deviate from the theoretical Gaussian shape. Systematic variations in particle size and/or constitution (e.g. rain or ice) over the pulse volume can also cause the signal to lose its ideal shape. For weaker signals, the noise level can make the signal very difficult to identify. Techniques (e.g., phase randomization) to minimize the effect of scattering returns from beyond the device's maximum unambiguous range (second trip returns) can elevate the noise level and introduce random fluctuations onto the signal. Clutter, RFI, non-atmospheric objects, such as birds and insects, and radar anomalies can produce contamination in the spectra for radar. Other Doppler measurement devices, (e.g. acoustic radars, or sodars), have similar sources of contamination. The task is then to identify the atmospheric signal in the spectra and minimize the effect of contamination on the moment calculations.

Current Moment Estimation Methods

Current moment estimation methods fall into two categories: fast or highly accurate. The so-called pulse-pair and peak-picking methods are fast, but they do not address the contamination problems. The highly accurate National Center for Atmospheric Research (NCAR) Improved Moments Algorithm (NIMA), typically used for Doppler wind profilers, does a very good job of addressing contamination problems and utilizing quality control, however it is too computationally inefficient for use in most existing scanning Doppler measurement systems.

Pulse-Pair Method

The fastest method for determining spectral moments is the so-called pulse-pair method. The pulse-pair method is described in *Doppler Radar and Weather Observations,* by R. J. Doviak and D. S. Zrnic, Academic Press, 1993. The time-domain pulse-pair method computes the moments directly from the complex time-domain signal, without requiring spectra to be computed. For moderate to high SNR and little contamination from other sources, first moment estimates using pulse-pair methods are usually accurate. On the other hand, second moment estimates are much more sensitive to SNR and are also easily corrupted by signal contamination. These problems in moment estimation under low SNR conditions can be seen in the moment estimations by the pulse-pair method for the upper range gates of FIG. 4.

On FIG. 4, note that each range gate (horizontal slice) represents the amplitude of a spectrum as a function of Doppler velocity. The cross marks the first moment. The bar is indicative of the second moment. The more distant range gates have lower SNR and hence, inaccurate moment estimations.

The pulse-pair method finds the first moment of the spectrum by assuming that there is only one signal in the spectrum and using the argument of the complex autocorrelation function. Assuming that the autocorrelation has a Gaussian shape, the second moment can be determined from the logarithm of the ratio of the signal power to the magnitude of the autocorrelation at one lag. The moments will be in error if the SNR is low, if contamination signals are present, or if the signal is non-Gaussian.

Quality control can be done with the SNR, (i.e., throwing out moments when the SNR is below a specified value). The low SNR case is easy to detect, but the influence of multiple signals, or a single signal that does not resemble a Gaussian, is much harder to detect in the time domain. If the data is transformed to the spectral domain, much of the speed advantage is lost, but quality control algorithms that can consider the shape of the signal become possible. In the spectral domain, the peak-picking method is generally more accurate than the pulse pair method.

Peak-Picking Method

In the spectral domain, the most effective of the fast methods is the so-called peak-picking method. Assuming that only one signal is present in the spectrum, the peak amplitude in the spectrum is the peak of the signal, as can be seen in FIG. 3. The first and second moments are calculated using the spectral region around the peak with either integration or a fit to a Gaussian. The signal region is usually determined by the bounds at the velocity bins (so-called velocity "cut-offs") where the spectrum crosses the noise level nearest to the peak in both increasing and decreasing velocity directions, as seen in FIG. 3.

FIG. 5 shows moments estimated by the peak-picking method that are more accurate than those estimated by the pulse-pair method (FIG. 4) for low SNR signals. On FIG. 5, note that each range gate represents the amplitude of a spectrum. The cross marks the first moment. The bar is indicative of the second moment.

The peak-picking method and the pulse-pair method both have problems when contaminants create spurious peaks in the spectra. NIMA, in essence is a peak-picking method, however, it uses sophisticated processing to find the desired signal region and the proper velocity cut-offs, even in the presence of significant contamination. NIMA also uses more elaborate quality control than the SNR quality control often used with the fast moment estimation methods.

Quality Control Using SNR

In addition to the problems involved in estimating the moments of the spectra, there is also the problem of determining the reliability of the estimates. If the scanning systems are to be used for evaluation of turbulence or other hazards, then estimates from questionable data need to be removed or discounted. Current methods such as the pulse-pair and peak-picking methods can use strict SNR thresholds to remove poor quality estimates, but that measure does not address poor quality estimates from multiple signals in spectra with above-threshold SNR. NIMA does more sophisticated quality control, calculating confidence values using SNR as well as many other indicators. NIMA was originally developed for profiler systems, which due to a relatively low data rate, permit more sophisticated processing than scanning Doppler measurement systems.

Processing for Profilers Versus Scanning Doppler Measurement Systems

Doppler spectra from scanning Doppler measurement systems are more difficult to extract accurate moments from than spectra from profilers. Firstly, the time constraints are much more stringent. Profilers dwell along one pointing direction for time periods of many seconds to a few minutes, whereas scanning systems frequently process an azimuth in time periods of tens of milliseconds. The second large difference is that fewer spectra are available for averaging and/or filtering in scanning systems. Profilers, which compute many individual spectra in the dwell time, average over many spectra. Scanning systems are restricted in the number of spectra that could be averaged by the motion of the Doppler measurement device and/or the lack of overlap between some adjacent pulse volumes. Second-trip returns are also far less of a problem for profilers. The profiler pulses are less likely to encounter multiple cloud structures when they are traveling vertically, than the scanning radar and lidar pulses that travel horizontally or obliquely. Some problems that profilers encounter are less prominent in scanning systems, however. For example, RFI is much less frequent in scanning radars and lidars than in profilers, but contamination can still be a problem, in general.

Spectral Smoothing

Due to the random motion of the scatterers, a single, raw Doppler spectrum is "noisy," resulting in problems with accurate moment estimation. This "noise" is not only from systematic hardware noise, but is also due to the random motion of the scatterers relative to each other. Averaging spectra over space and/or time can alleviate a certain amount of this problem. Due to natural inhomogeneities and non-stationarities in the signal field, only a limited number of spectra should be averaged. Hence, the effect that averaging over a small number of samples has on reducing the noise from the scatterers is limited. None-the-less, spectral averaging helps in the detectability of the signal. Depending on the processing resources, a median filter may be used to great benefit over simple averaging. This is because the median filter is more robust than averaging when the data contains outliers.

The averaging of spectra with scanning Doppler measurement devices is not a standard practice. If there is rapid motion by the scanning platform, temporal averaging cannot be performed. For a stationary or slowly moving platform with return times commensurate with approximate stationarity in the data, averaging can be performed over time, if the range gates are offset to account for the differences in locations of the scatterers relative to the range gates. This offsetting is difficult because the differences in locations will not be perfectly known or necessarily be an integral number of range gates. If approximate homogeneity of the scatterers holds between neighboring range gates, averaging along range can be performed. For ranges relatively close to the device where approximate homogeneity holds, averaging across azimuths can also be performed.

NIMA

NIMA overcomes most of the accuracy problems of the pulse-pair method and the peak-picking method by employing fuzzy logic and image processing techniques to recognize the two-dimensional (Doppler velocity and range) regions of the spectra (cf. FIG. 4) that contain information about the desired signal. Unfortunately, NIMA is too computationally complex to run in real-time for scanning Doppler measurement devices.

NIMA approaches moment estimation as primarily a pattern recognition problem. That is, NIMA identifies the region of the spectra that corresponds to the atmospheric signal using fuzzy logic image processing methods. The atmospheric signal is usually clearly identified as a region that extends through many range gates. The RFI and clutter signals can also create regions that extend through range, but these regions are often much narrower than the atmospheric signal. NIMA uses fuzzy logic image processing methods to differentiate between these contaminant features and the desired atmospheric ones. NIMA uses a series of tests on the data to determine the extent of the atmospheric signal region and eliminate noise or contaminants. This process can be computationally intensive, but results in very accurate moment estimates, even for highly contaminated signals and for some low SNR signals.

In addition to producing more accurate moment estimates by identifying the signal region as distinct from the contaminants, NIMA also generates sophisticated quality control or confidence values. A very sophisticated process is used in NIMA to obtain the confidences, which is generally too computationally expensive for application to scanning Doppler measurement devices.

The problem at hand is to develop a method of combining the fast signal processing techniques with the some of more sophisticated quality techniques to produce the most accurate moment estimates possible given limited processing capabilities.

SUMMARY OF THE SOLUTION

The invention helps solve the problem of combining the fast methods with sophisticated quality control by implementing a multistage computation method. The multistage computation method calculates moments from the parts of the spectra that contain information about the signal, while disregarding the portions of the spectra that are shaped primarily by contaminants. The use of quality measures allows for efficient use of limited processing time on computations that are most likely to improve the accuracy of the moment estimates. For Doppler measurement devices, this multistage computation method is more flexible and generally more accurate than the other fast moment calculation methods, and is faster than the image processing method used with profilers. The multistage processing method consistently produces better moments than the pulse-pair method or simple peak-picking, especially for low SNR signals and clearly identifiable contaminants. The multistage processing method also produces confidences that range in value from zero to one for the moment estimates, which are more meaningful than binary results of SNR thresholding.

Examples of the invention include methods of operation, moment estimation systems, and software products. In these examples, a receiver receives signals that indicate information related to scatterers. One example of these signals comprises reflected energy from a Doppler scanning system. The moment estimation systems include a processing system and an interface that receives data from the signals. The software product includes software that directs a processing system, and a storage system that stores the software.

In some examples of the invention, the processing system receives data from the signals and tracks allowed processing time for the data. The processing system performs a first stage of processing for the data to generate first estimates of spectral moments for the signals. The processing system performs additional stages of processing for the data as the allowed processing time permits and stops the additional stages of processing for the data when the allowed processing time expires. The additional stages of processing may comprise generating second estimates for at least some of the spectral moments.

In some examples of the invention, the processing system receives data from the signals. The processing system tracks allowed processing time and processes the data to generate first estimates of spectral moments for the signals. The processing system generates first confidence factors representing quality measures for the first estimates of the spectral moments. If the allowed processing time permits, the processing system selects selected ones of the spectral moments based on the first confidence factors and generates second estimates of the selected ones of the spectral moments.

The processing system may average or median filter the data to reduce noise. The processing system may calculate noise levels and identify spectral points for use in moment estimation. The processing system may generate the first confidence factors based on consistency across at least one of: range, pointing direction, and time.

The processing system may select the selected ones of the spectral moments that have lower first confidence factors relative to neighboring ones of the spectral moments. The processing system may generate estimated noise levels and cut-offs for the selected ones of the spectral moments based on calculated noise levels and cut-offs for the neighboring ones of the spectral moments. The processing system may use the estimated noise levels and cut-offs to identify spectral points for use in moment re-estimation.

The processing system may generate second confidence factors representing quality measures for the second estimates of the selected ones the spectral moments if the allowed processing time permits. The processing system may generate the second confidence factors based on consistency across at least one of: range, pointing direction, and time. The processing system may generate third estimates of some of the selected ones of the spectral moments based on the second confidence factors if the allowed processing time permits.

DESCRIPTION OF THE DRAWINGS

The same reference number represents the same element on all drawings.

DETAILED DESCRIPTION OF THE INVENTION

FIGS. 6–20 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Radars and lidars use a transmitter and receiver to measure the radial motion of scatterers within the radar/lidar pulse volumes. The transmitter sends out a series of pulses in a given direction. The complex time series of received amplitudes for a given range is then Fourier transformed to produce a Doppler spectrum for that range. As the device scans in azimuth, a sequence of Doppler spectra is generated. The term "range gate" will be used to describe the information at each range and azimuthal location. The resultant range-azimuth field of Doppler spectra is processed to calculate a field of zeroth moments (signal power), first moments (radial velocity of the scatterers), and second moments (related to the variation of the scatterers' radial velocities within the pulse volume).

NESPA—FIGS. 6–16

The NCAR Efficient Spectral Processing Algorithm (NESPA) is a method for determining Doppler moments and associated quality control values ("confidences") from Doppler spectra. The method uses a multistage approach to finding moments from spectra to optimize the trade-off between processing capacity and accuracy. For real-time applications, a trade-off must be made between simplistic, yet computationally efficient moment generating methods and more sophisticated, yet inefficient, methods. Typically, more sophisticated methods will yield more accurate moments. In NESPA, this trade-off is made in stages, so that accuracy increases as available processing time increases. Furthermore, the important addition of confidences allows for an indication of the estimated quality of each moment— regardless of the number of stages that are performed. Typically, as the number of stages increases, the quality of the moments and the values of the confidences increase.

Figure 6:
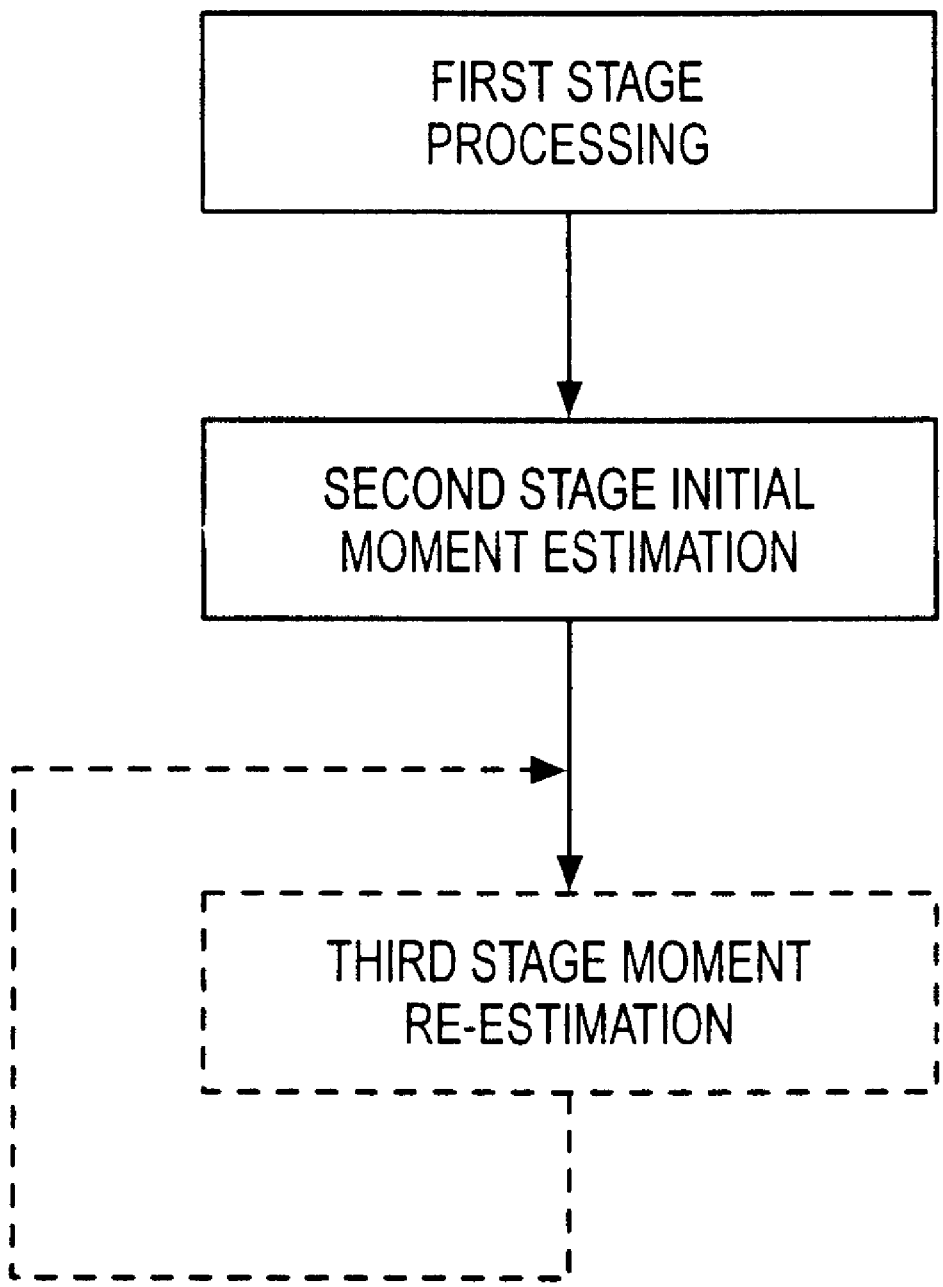
FIG. 6 illustrates a flowchart of NESPA stages and options in an example of the invention.

The major components of the multiple stage system are shown in FIG. 6. On FIG. 6, optional processes are denoted with dashed lines and performed as time permits. The basic stages are:

1) The detectability of the signal in the spectra is improved using median filtering and/or averaging, 2) For each range gate, the noise level is calculated, the initial moments are calculated using a simplistic method, and the confidence calculations for the moments are made as time permits, and 3) The moments that show potential for improvement are re-calculated using more sophisticated methods and the confidence values are re-calculated, as time permits.

As many additional stages, in the form of the third stage, can be added, as the total processing time permits. Each additional stage uses different, usually more sophisticated approaches to evaluating the quality of the moments and re-estimating the moments for spectra that show potential for improvement.

The philosophy of the method is to use the available processing time to produce the most accurate moments possible. Confidences are used to indicate which moment estimates are "good", and where "good" results were not obtained. Only those moments that appear to be problematic are re-estimated. This focus in processing is the key to the method's efficient use of limited computational resources. The confidence values can be used to prevent false alerting by downstream methods, such as wind shear or turbulence detection methods. This approach allows for more accurate moments to be computed in scanning Doppler measurement systems than were previously available. The multistage approach also provides opportunities for evolutionary improvement in the accuracy of moment estimates as the computing resources for Doppler measurement systems increase.

The processing time required for each of the stages can be adjusted to meet any real-time requirements. The more processing time that is available, the more sophisticated each of the subsequent stages can be. A suite of methods with varying levels of sophistication can be chosen from for each step in each stage. In the third stage, the available time for processing is checked, and processing of the moment re-estimation tasks are adjusted accordingly.

The key to NESPA's power is that it is iterative and adaptive. NESPA iterates to find better and better moment estimates. NESPA adapts to the processing constraints and requirements for each spectra. Spectra with contaminants and low SNR will generally require re-estimation of the moments, so they will require more processing time than spectra with a clearly defined signal.

Each stage has several options for the steps that make up the stage. For the first stage, the step is simply:

1) Preprocessing to reduce noise and eliminate outliers.

For the other stages, the steps are

2) Noise level calculation (optional in the third stage),
3) Signal identification,
4) Moment estimation, and
5) Confidence estimation.

The additional steps that are performed for the third stage are

6) Identification of spectra that produced moments that could profit from re-estimation, and
7) Evaluation of the re-estimated moments versus the original moments, The actual methods used at each step in each stage are selected from a suite of methods that may include those discussed here.

Preprocessing

Preprocessing is used to improve the quality of the spectra. The suite of options for the preprocessing includes 1) Spectral averaging,
2) Spectral median filtering,
3) A combination of spectral averaging and median filtering, and/or
4) Time domain processing.

Figure 1:
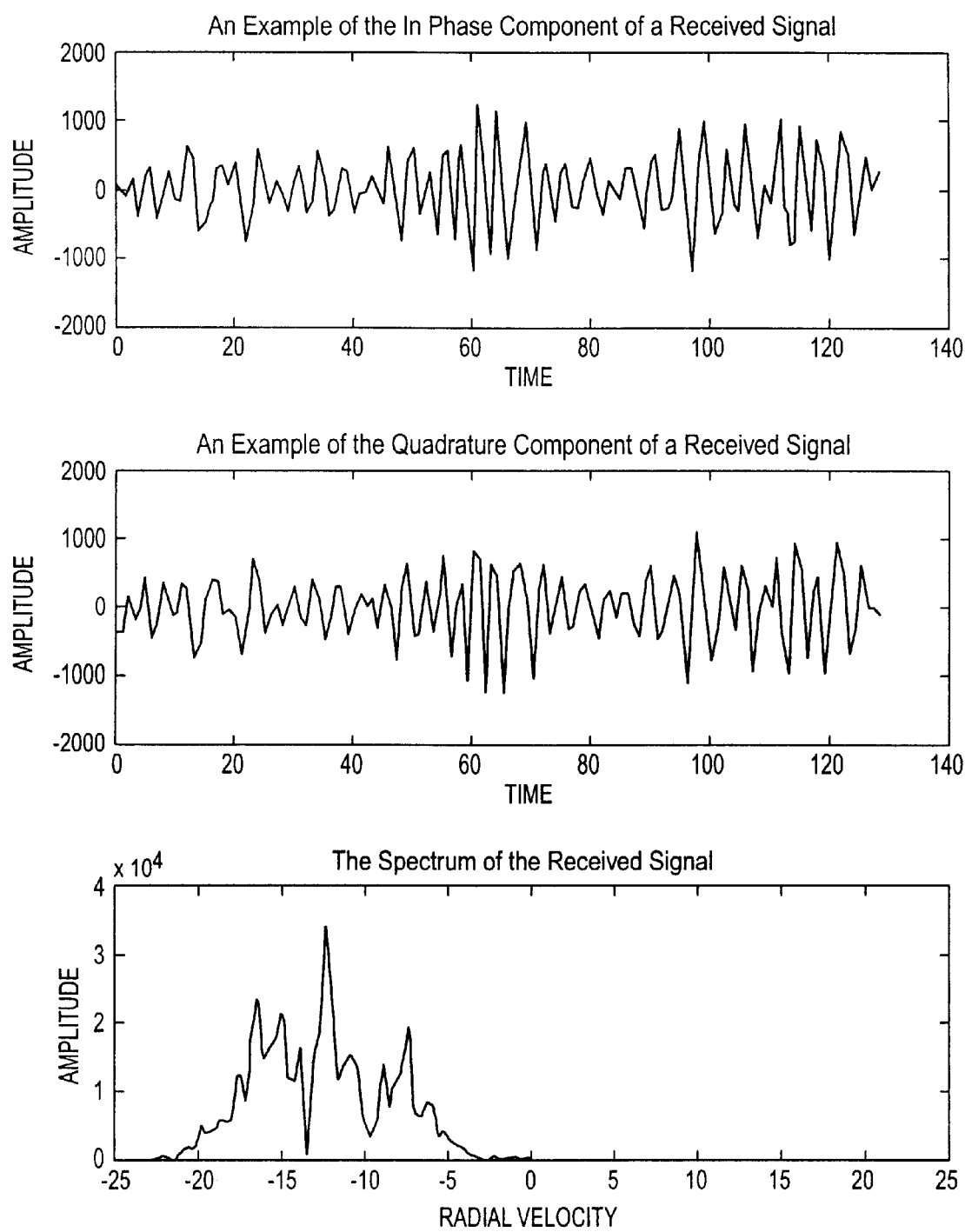
FIG. 1 illustrates Doppler time domain signals and spectra in the prior art.
Figure 2:
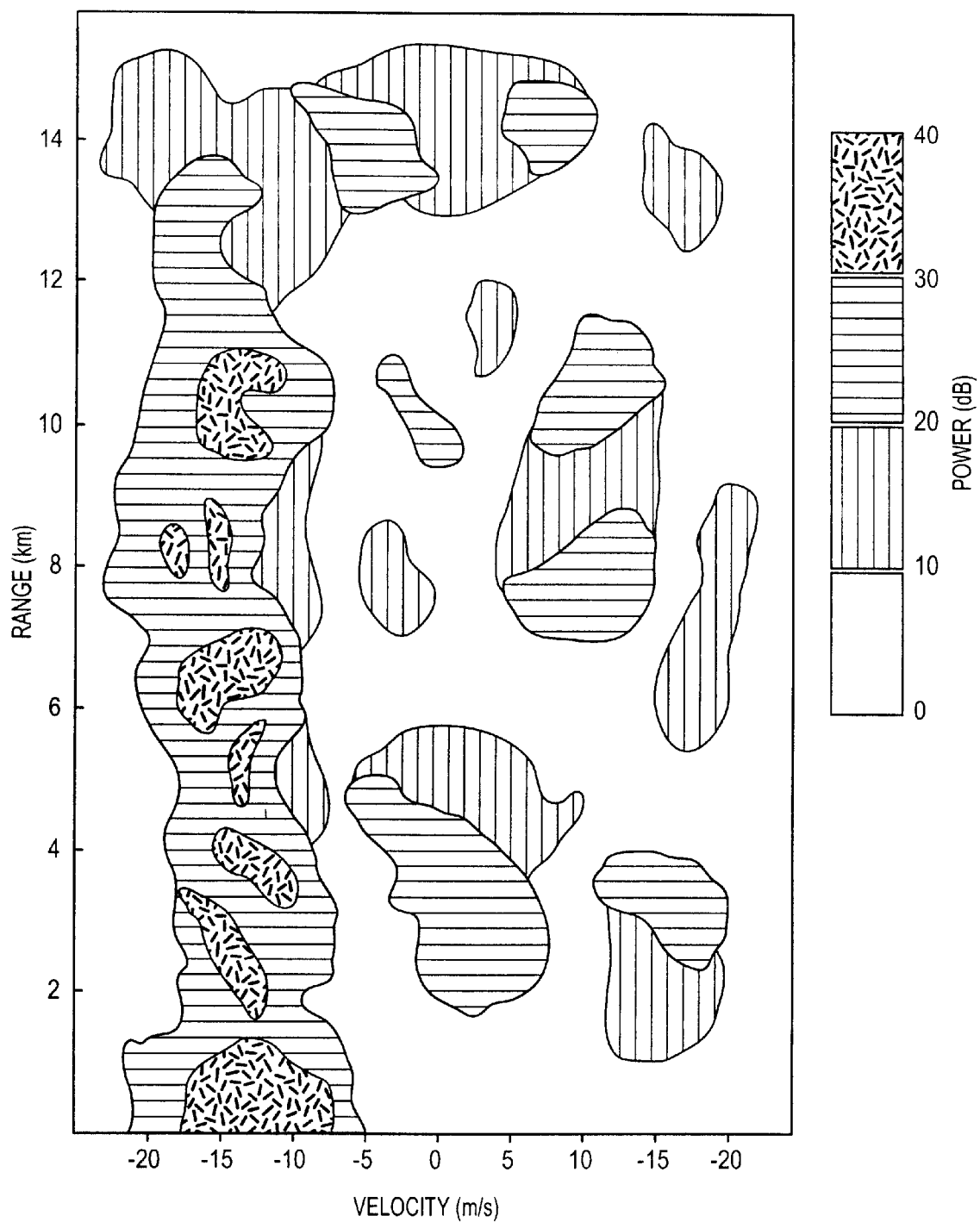
FIG. 2 illustrates a contour plot of stacked spectra for one azimuth in the prior art.
Figure 7:
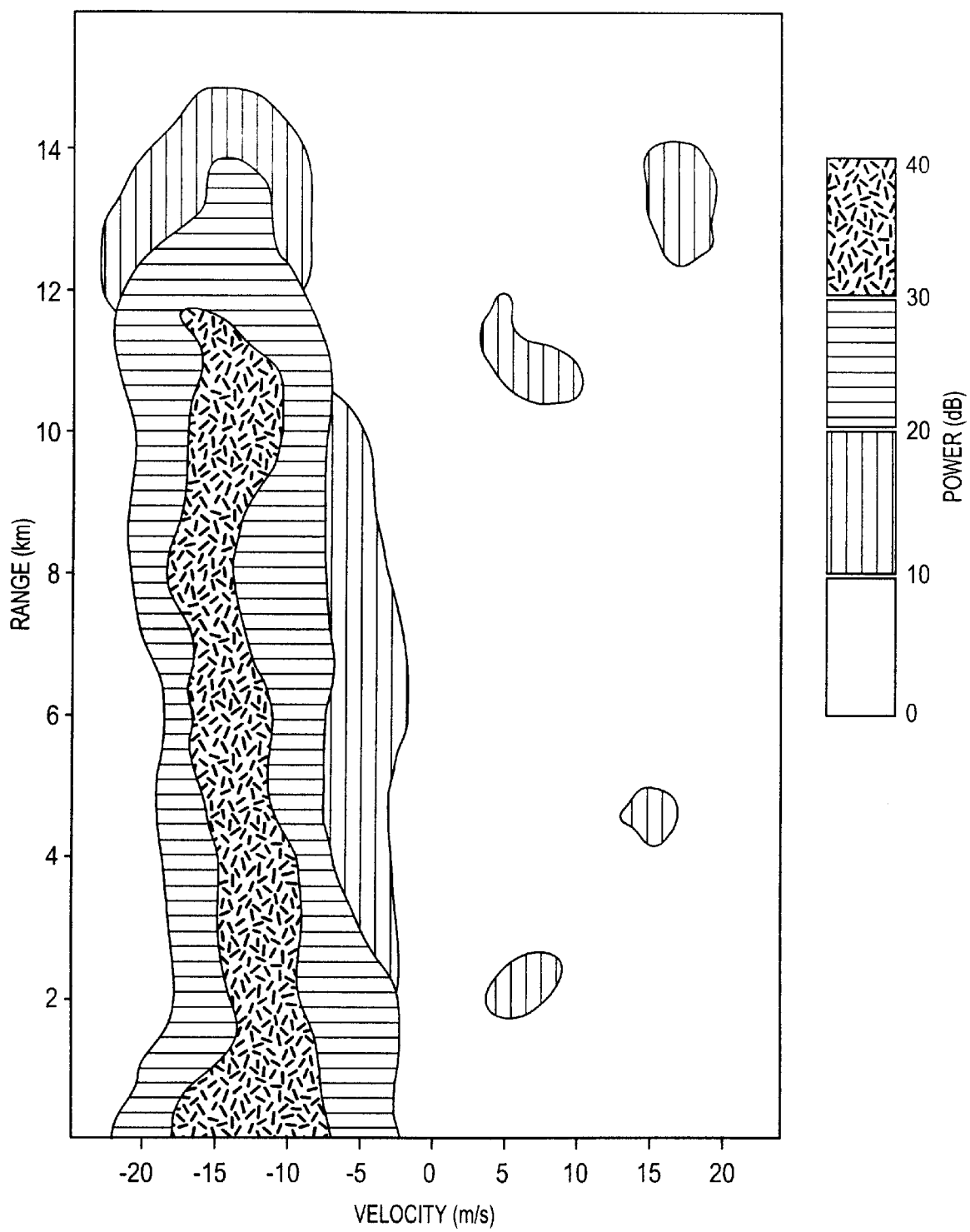
FIG. 7 illustrates spectra that has been averaged over five azimuths and median filtered over a 5×5 window in range and velocity in an example of the invention.
Figure 8:
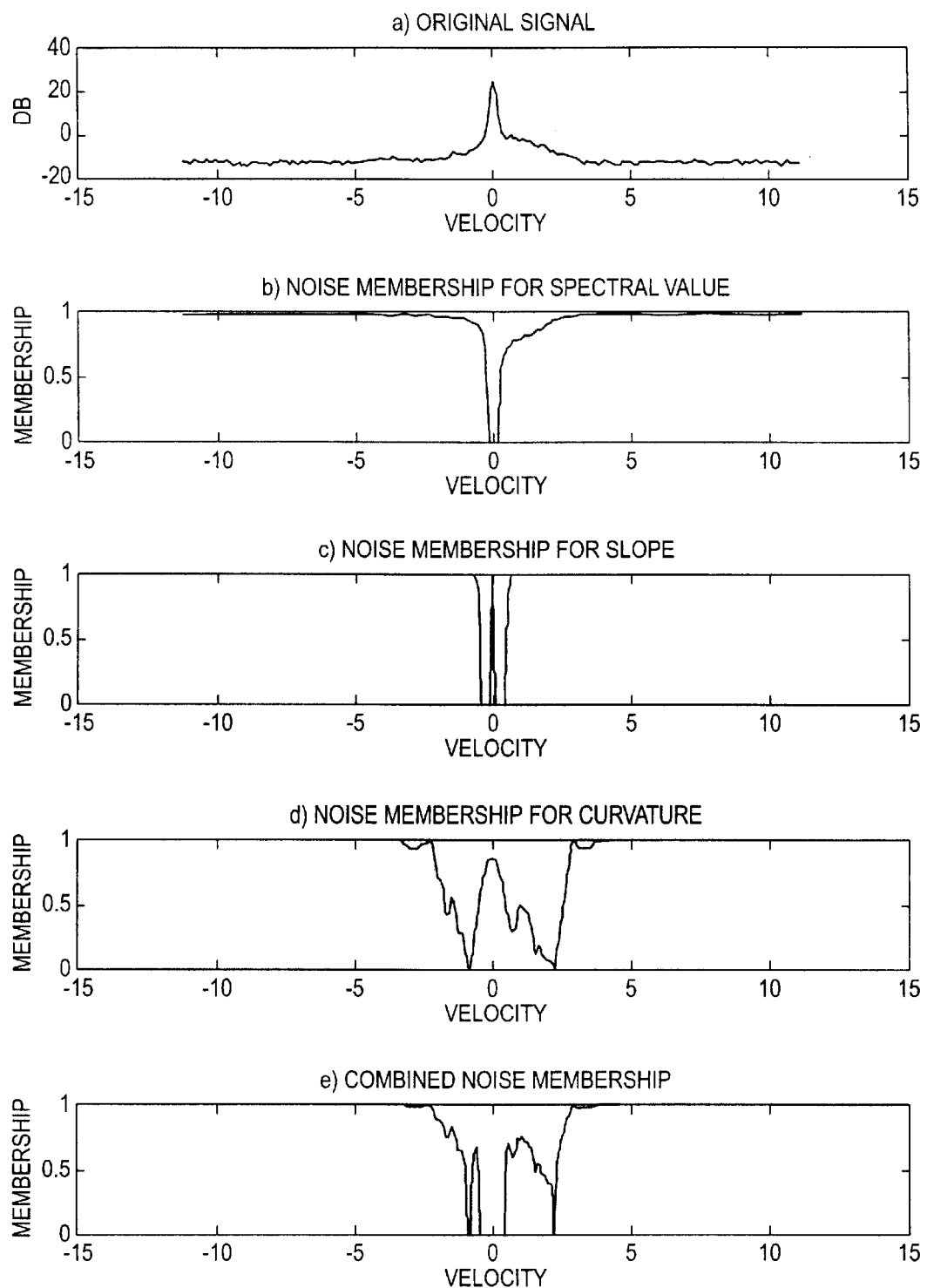
FIG. 8 illustrates noise membership values associated with each point in a spectrum in an example of the invention.

The spectral averaging and median filtering can take place over range, pointing direction (e.g., azimuth), Doppler velocity, and/or time. FIGS. 2 and 7 show the difference between the unaveraged spectra, and the spectra that have been averaged over a window in azimuth, and median filtered over a window in range and Doppler velocity for each azimuth. The signal is much more clearly delineated in the case where the spectra have been preprocessed in this fashion.

Ideally, the largest number of spectra that can reasonably be considered as sampling a similar area in time and space should be averaged or median filtered to remove outliers and reduce the effects of noise and contaminants. Scanning devices may re-visit locations in space, depending on the relative motion of the Doppler measurement device and the location of the scatterers. In this example, spectral averaging and median filtering the spectra over time is possible, in addition to spectral averaging and median filtering over azimuth, range and velocity.

A trade-off must be considered regarding the extent of the averaging/median filtering. On the one hand, to receive the most benefit, the largest number of samples should be used in the averaging or median filtering window. While on the other hand, to avoid corrupting the signals with the inherent inhomogeneity and non-stationarity of many scatterers, a small number of samples consistent with the assumed scales of homogeneity and stationarity should be used in each window. A compromise number of samples that balances these two contradictory requirements is usually made a priori.

Averaging is more computationally efficient than median filtering. However, median filtering is preferred due to its ability to remove outliers in the signal. Averaging over azimuths and median filtering over range and velocity is a good second choice to median filtering over all three parameters. Averaging is less effective for removing outliers, but can still improve the quality of the spectra. Averaging improves the quality of the spectra more than the median filter in the case when the data contains no outliers. In applications where the computational resources are highly constrained, averaging alone might be necessary, but most systems could probably support a least a very small (3×3) median filter in addition to the azimuthal averaging.

Another type of preprocessing that can be beneficial is time-domain filtering or editing. Point targets, such as the signals from scatterers that are due to transitory objects in the field of view, can and should be filtered out before spectral processing. This type of filtering may not be possible for some computer architectures if the access to time domain data is restricted.

Noise Level Determination

Identifying the noise level is important for identifying the signal and evaluating the quality of the signal using SNR. The suite of options for noise calculations includes 1) A fixed noise level based on the hardware characteristics,
2) A calculated noise level using the sum of the inverse of the spectral bin values raised to a power (the "inverse spectral" noise method).
3) A calculated noise level based on regions of interest (ROI's) determined by local fits (the ROI method),
4) A calculated noise level based on the Hildebrand-Sekhon method, and
5) A calculated noise level based on Kolmogorov-Smirnov method.

A constant noise level has the least computational complexity, but does not account for noise sources associated with the actual signal and some forms of preprocessing. The other options attempt to capture the noise value from all noise sources.

The inverse spectral noise algorithm calculates the noise using the nth root of the inverse of the sum of the inverse of the individual spectral amplitudes, raised to the nth power. For a given azimuth, a, and range gate, r, the noise, N, is $$N(a, r) = \left(B\left(\sum_v \frac{1}{(s(a, r, v))^n}\right)\right)^{1/n},$$

where v is the velocity bins and s (a, r, v) is a spectral value at a given azimuth, range gate and velocity bin, and B is a bias factor. The power, n, used in the calculation depends on the implementation. This algorithm emphasizes the low amplitude spectral values in the noise calculation. If the signal is large enough, its spectral values are essentially eliminated from the calculation since their inverses will be small. The larger the power, the more the larger values are suppressed. The advantage of this method is speed, since it requires only a single pass through the spectrum. The disadvantage is that it can overestimate the noise level if the signal or signals are very broad.

The ROI method is a fuzzy logic method that produces a number between zero and one indicating the degree with which a spectral point is to be included in the noise level estimate. The ROI method does local quadratic fits to the pre-processed spectrum to determine curvature and slope in either one or two dimensions (velocity, or velocity and range). After filtering, the points in the spectrum that are dominated by noise should have low slopes and curvatures compared to the signal points (see FIG. 8). Each point is given a membership value based on the slope and curvature at that point. The value one is given to points that are definitely associated with noise, and the value of zero is give to points that are definitely not associated with noise. If there are no points with sufficient membership, then a default value of the noise is used based on the hardware or other range gates. On FIG. 8, note that the membership values are low in the signal region in the middle of the spectrum, where the atmospheric signal is located.

The Hildebrand-Sekhon and Kolmogorov-Smirnov methods rank the amplitudes of the spectrum and use statistical methods to identify noise points and signal points. Only the noise points are included in the noise calculations. These approaches generally take several iterations through subsets of the spectrum. Broad signal areas can be a problem and may require a default value to be used for the noise. Spectra that do not have the expected statistical distributions can cause these methods to produce incorrect noise levels.

Signal Identification

Signal identification is the process of determining which points in the spectrum are to be associated with the signal for the moment estimation. If the pulse-pair method is used for the initial moment estimation then no signal identification is required. For the other moment estimation methods, the region of points in the spectrum that are most likely to be from the signal need to be identified. For the initial signal identification of the second stage, the suite of options for the signal region include 1) The region in the spectrum from the spectral peak to the noise level,
2) The region in the spectrum from the spectral peak to the nearest inflections in the spectrum that are sufficiently lower than the peak.

For subsequent stages, additional options are to include information from

3) The region in the spectrum corresponding to location of the signal in adjacent range gates.
4) The region in the spectrum corresponding to the locations of the signal in the previous azimuth, if this information is available.

Identification of clutter or contaminant regions of the spectra can be included in any of these options.

Figure 3:
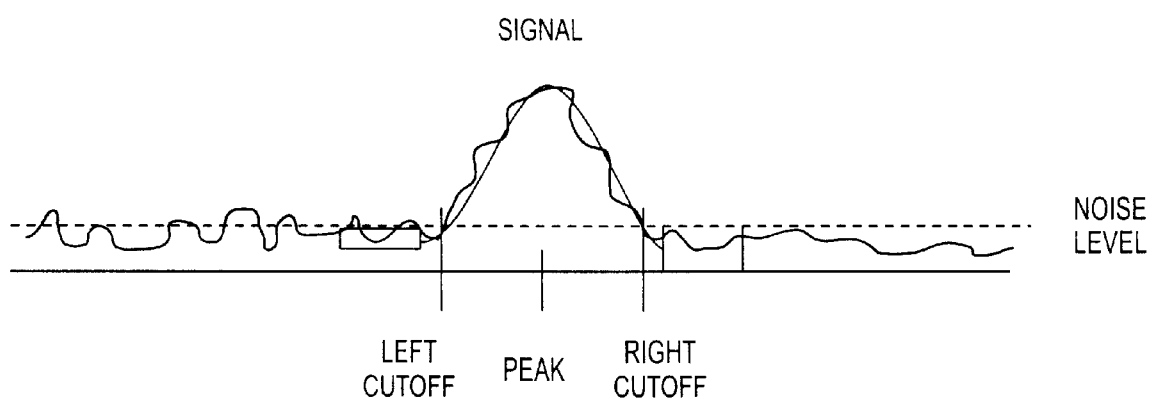
FIG. 3 illustrates a Gaussian fit to a signal in a spectrum from one range gate and azimuth angle in the prior art.
Figure 4:
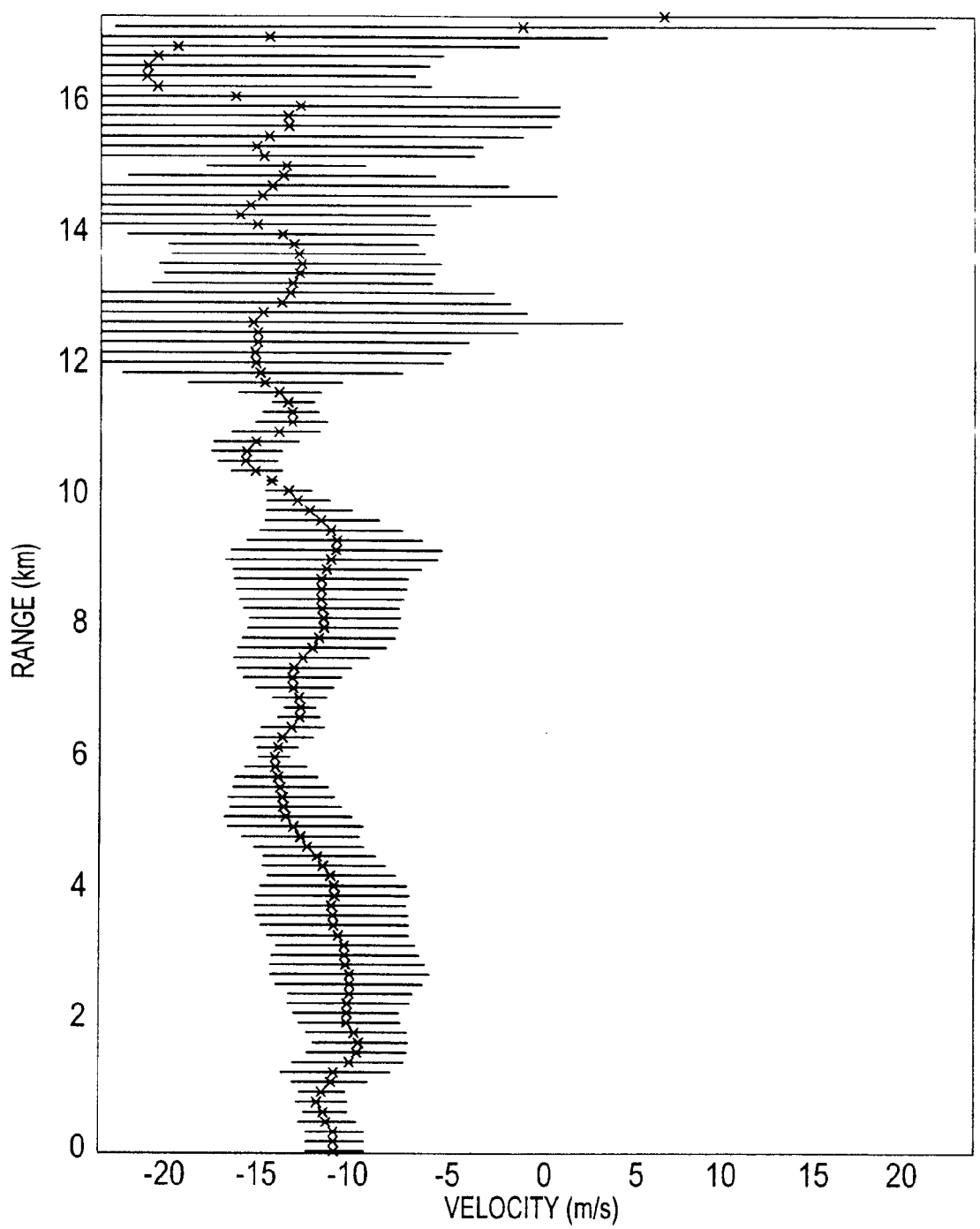
FIG. 4 illustrates pulse-pair moments for stacked spectra in the prior art.
Figure 5:
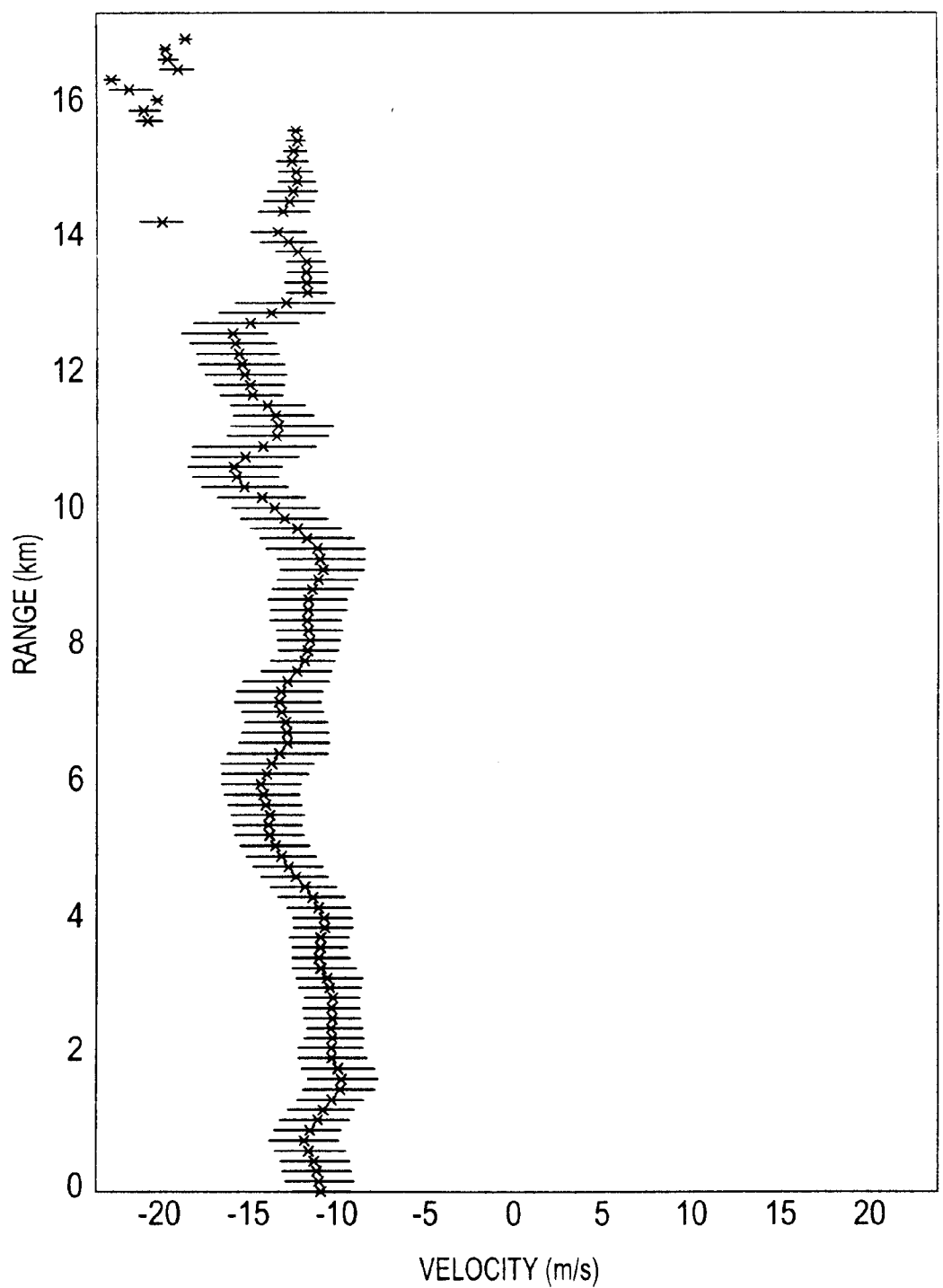
FIG. 5 illustrates peak-picking moments for stacked spectra in the prior art.

The peak-to-noise level calculation identifies the signal region as those spectral points from the spectral peak value to the noise level in both directions, as is shown in FIG. 3. This approach is fast since it only involves searching the spectrum for the peak and adding points in each direction until the noise level is reached. The moment calculation can occur as the points are added to save some memory access time. One problem with this method is that adjacent signals from contaminants can be incorporated into the region, if they are too close to the primary signal. Side-lobes, which are a function of antenna size and wavelength, can also cause problems with determining the correct extent of the signal region. Stationary clutter can cause a problem for stationary platforms. If the signal does not overlap with the clutter too much, a simple solution is to remove a region around zero that is large enough to account for the effects of smoothing. The other problem with this, and other methods that use the peak in the spectrum, is that the peak may be due to contamination, not the signal. In NESPA, the re-estimation of the moments usually takes care of this problem.

Figure 9:
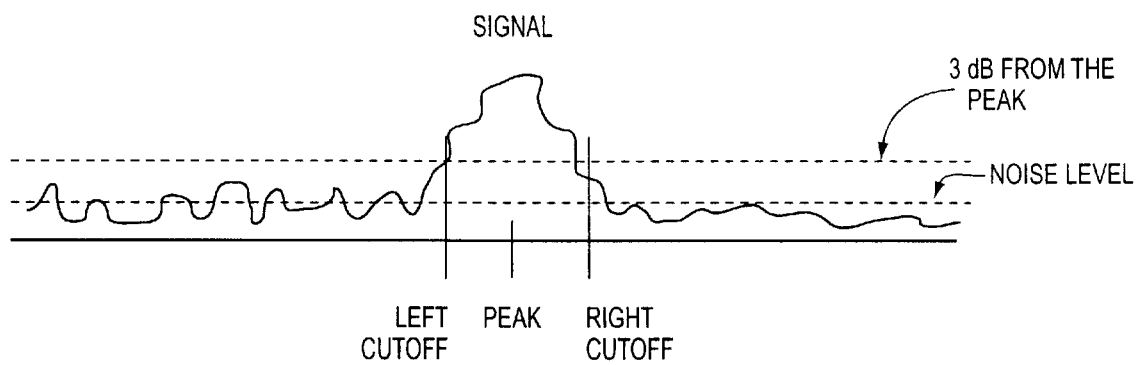
FIG. 9 illustrates a spectrum with inflection points marked in an example of the invention.

The peak-to-inflection point method is similar to the peak-to-noise level method. The signal region is defined from the maximum of the peak to the nearest "good" inflection point or the noise level of the signal in each direction, respectively, as is shown in FIG. 9. An inflection point is where the first derivative of the spectrum as a function of Doppler velocity changes. The usefulness of an inflection point for defining the signal region can be defined by its spectral amplitude relative to the peak value. For example, a "good" inflection point could be defined as having a spectral amplitude at least 3 dB less than the peak. The inflection in the spectrum can be determined by taking running differences, or, if more computational complexity is acceptable, by taking the derivatives of local fits to the spectrum. The peak-to-inflection point method works well to prevent the inclusion of side-lobes and some clutter signals. On FIG. 9, note that the inflection points nearest the peak that are at least 3 dB below the peak are used to define the signal region.

The endpoints of the signal regions are stored as velocity cutoffs that can be accessed by other stages of processing to determine the signal regions from adjacent range gates or pointing directions. For example, in the third stage, the cutoffs and moment confidences from "good" moment estimates from the initial region identification can be used to estimate the cutoffs for the re-estimates in adjacent range gates of "bad" moments. These new cutoffs can be found by either doing a confidence-weighted average of the "good" cutoffs, or by doing a fit using the "good" cutoffs and interpolating through the questionable range gates to determine their cutoffs. This approach can also be taken with cutoffs from previous azimuths at the same range location. Before the moments are re-calculated, these cutoffs can be refined using the peak within the new cutoffs and either the noise level or inflections as described above.

The ratio of the peak to the noise level (an approximation to SNR) can determine if the signal region is worth processing at all. In the case of very low signal power, the peak may not be statistically different from the noise level, so that spectrum should be flagged as "bad" and the confidences for the associated moments set to zero. The width of the signal region can also be used in the measures of confidence for the moments. If the signal region is too narrow or too broad relative to nominal values, then the moments may not be accurate. Such moments are given low confidence values.

Moment Estimation

The key calculation is the moment estimation. The moment estimation can be done using any of the following methods:

1) The pulse-pair method,
2) Using the spectral values in the identified region to obtain the moments via weighted sums ("integration"), or 3) Fitting the spectral values in the identified region and computing a Gaussian fit; whose parameters give the moments.

For the initial moment estimation of the second stage, either pulse-pair or integration can be chosen since they are both relatively fast. For the subsequent moment estimations in the third stage, integration or a fit to a Gaussian might produce more accurate moments.

Using the integration method for a given range and pointing direction, the first moment is simply the sum of the spectral values $s_i$ (=$s(a, r, v_i)$), above the noise level, N (=$N(a, r)$), ($S_i$=$s_i$−N), weighted by the velocity, $v_i$, and divided by the zeroth moment, $M_0 = \Sigma S_i$, for each point in the signal region, $$M_1 = \Sigma v_i S_i / \Sigma S_i.$$

The second moment is the sum of the spectral value weighted by the difference in the velocity from the first moment, squared, $$M_2 = \Sigma(v_i - M_1)^2 S_i / \Sigma S_i.$$

Higher order moments use higher powers of the velocity term.

The Gaussian fit is generally performed by taking the logarithm of the spectral values then fitting a second-order polynomial. Assuming that the signal is a Gaussian that has the form, $$G(v_1) = [A/\{(2\pi)^{1/2} M_2\}] \exp\{-(v_i - M_1)^2/2M_2^2\},$$

where A is the amplitude of the peak, then, the natural logarithm (ln) of the signal is $$\ln[G(v_i)] = \ln[A/\{(2\pi)^{1/2} M_2\}] + (v_i - M_1)^2/2M_2^2 = v_i^2/2M_2^2 - v_1 M_1/M_2^2 + (M_1^2 + 1 \ln[A/\{(2\pi)^{1/2} M_2\}])$$

The coefficient on the second-order velocity term is proportional to the inverse of the square of the second moment, and the coefficient on the first-order velocity term is the first moment divided by the square of the second moment. The zero-order term provides information about the zeroth moment. The quadratic fit can be performed by either Cramer's rule, which is faster, or singular value decomposition (SVD), which is more accurate and provides more information about the quality of the signal.

The Gaussian fit can be more accurate than integration if the signal is noisy, but it may be less accurate if the signal is bimodal, skewed or non-Gaussian in some other way. However, error in the Gaussian fit can provide information about problems in the data. The third and fourth moments can also provide more information about the shape of the signal. The error in the Gaussian fit and/or the higher-order moments can be used in confidence estimation, or in choosing moments that may require re-calculation.

Confidence Estimation

The confidence in the moment estimates is nearly as important as the moments themselves. The confidences are used to identify range gates where the moments need to be recomputed, and range gates where the moments need to be discounted in downstream applications. The construction of the confidences is based on fuzzy logic methods and has three parts:

1. The choice of measures to base the confidence on,
2. The membership functions for mapping of the measure to the confidence interval (usually zero to one), and
3. The method of combining the confidences from the different measures into a single confidence for the moment.

The confidence used for determining whether the moment estimates need to be recomputed, does not need to be the same confidence that is given with the moments for downstream processing. The confidence for making moment re-estimation decisions will primarily be based on measures that can be influenced directly by the moment re-estimations. The output confidence may be based on measures that are important to downstream processing. For example, a confidence based on continuity of first moment values as a function of range is very useful for moment re-estimation, but SNR confidence may be more useful for downstream processing.

Examples of measures that are used to calculate the confidence in the moments can take the form of measures of the signal quality and measures of the consistency in range and/or azimuth of the moments. A "good" signal has a "high" SNR, and does not have a noise level that is too inconsistent with the noise levels for the rest of the range gates in the same azimuth. Clearly, a small SNR is indicative of potentially problematic moments. On the other hand, an overly large SNR can signify contamination. A "good" signal also has an adequate number of spectral points in the signal region, but not so many points that the signal cannot be differentiated from the noise level. "Good" moments should vary slowly with range given the assumption that the true signals should be relatively continuous in space. The larger the distance between range gates, the less likely this assumption will be true. Also, the confidence measure needs to take into account physically realistic variations, such as shear as a function of range. Two simple measures that have been found to be good discriminators between "good" and "bad" moments are the variance in the moments as a function of range or azimuth, and the error in the local fit of the moments as a function of range or azimuth by a second-order polynomial.

Figure 10:
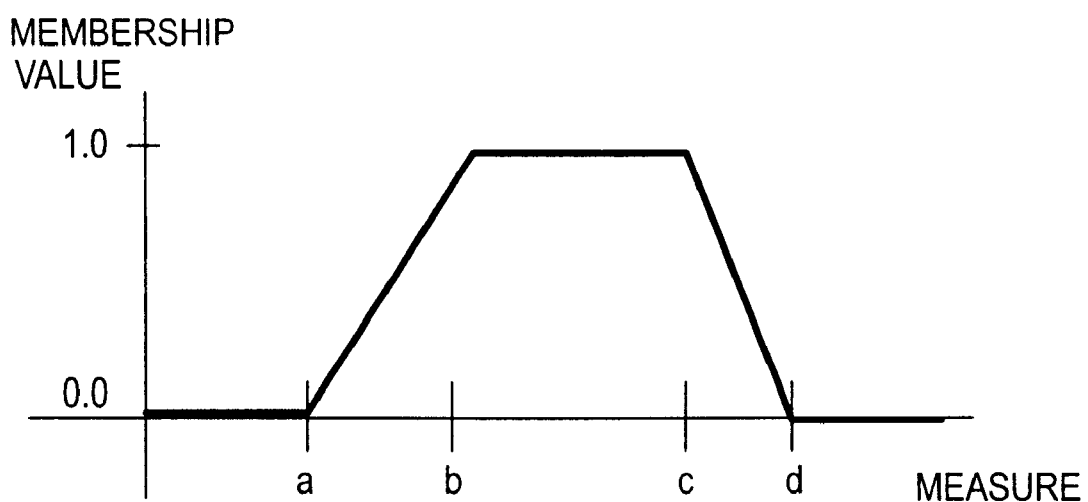
FIG. 10 illustrates piecewise linear mapping of a set of measures to membership values in an example of the invention.

Fuzzy logic provides for many different methods for the conversion of individual measures to confidence intervals using membership functions. The simplest membership function for positive measures that increase when the measure is less desirable, is a weighted exponential. The (negative) weight on the exponential determines how quickly the confidence goes to zero. Another simple membership function is a piecewise linear mapping (see FIG. 10), which can be applied to any type of measure. With two points, the mapping delineates between "good" and "bad" values, with a continuum in between. With three inflection points, a region of "good" values can be isolated from the "bad" values. Sigmodal functions and Gaussians are smooth functions that can be used in analogous ways. The shape of these functions does not have to be determined exactly for adequate confidence values to be produced. Adequate settings of the mapping parameters can often be performed with just a few characteristic spectra. More systematic determination of these mappings can produce better confidences. In FIG. 10, the points a, b, c, and d are endpoints of the line segments that make up the function. Each point (a, b, c, d) is a parameter that can be tuned based on the units and characteristics of the measure. (These points are not inflection points in the usual mathematical definition.)

Combining the confidences can be done geometrically, arithmetically or using both methods. A geometric combination multiplies all of the confidences using powers of different weighting factors, then takes the root of the sum of those weights, $$c_f = \left(\prod_j c_j^{w_j}\right)^{1/\Sigma_j w_j}, \text{ where } 0 \le w_j \le 1.$$

If the sum of the weights is zero, then the confidence is set to a default value. A characteristic of geometric weighting is that if any of the confidences are small then the final confidence is small. Zero confidence on any of the measures will cause the final confidence to be zero. Arithmetic weighting is simply the sum of the weighted confidences divided by the sum of the weights, $$c_f = \frac{\left(\sum_j w_j c_j\right)}{\left(\sum_j w_j\right)}, \text{ where } 0 \le w_j \le 1.$$

If the sum of the weights is zero, then the confidence is set to a default value. A zero weight can be used to remove a measure's confidence from inclusion in the final confidence. Both methods can be used together by calculating intermediate confidences using one method then incorporating these into the other method. The weights are chosen to weight the most skillful confidences the highest. They can be chosen by experts or by tuning with a few characteristic examples or a truthed data set. Typically the weights are chosen a priori, however they can be adaptive in the real-time processing.

Identification of Spectra for Moment Re-Estimation

Figure 11:
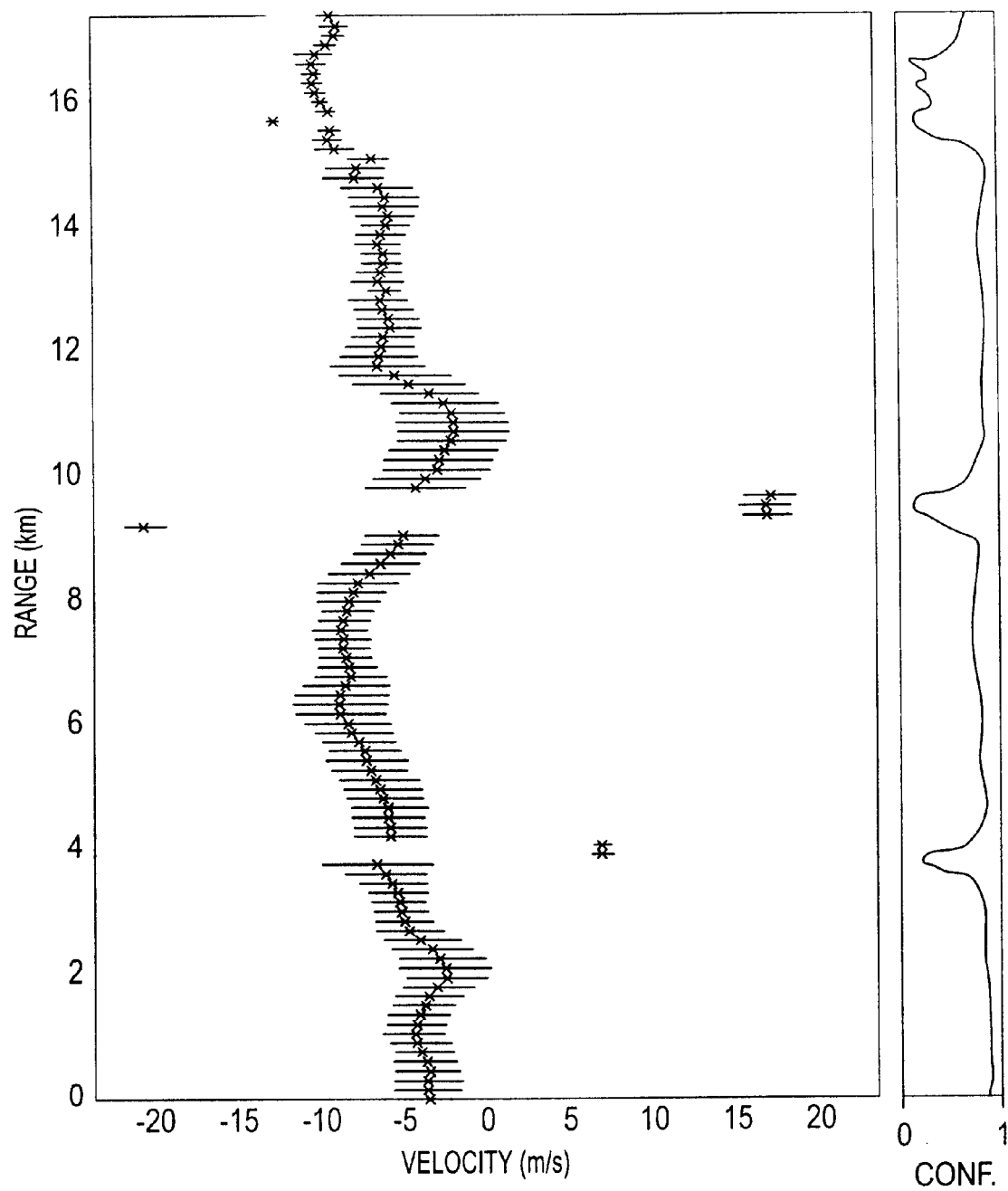
FIG. 11 illustrates initial moment calculations for the second stage of NESPA in an example of the invention.
Figure 12:
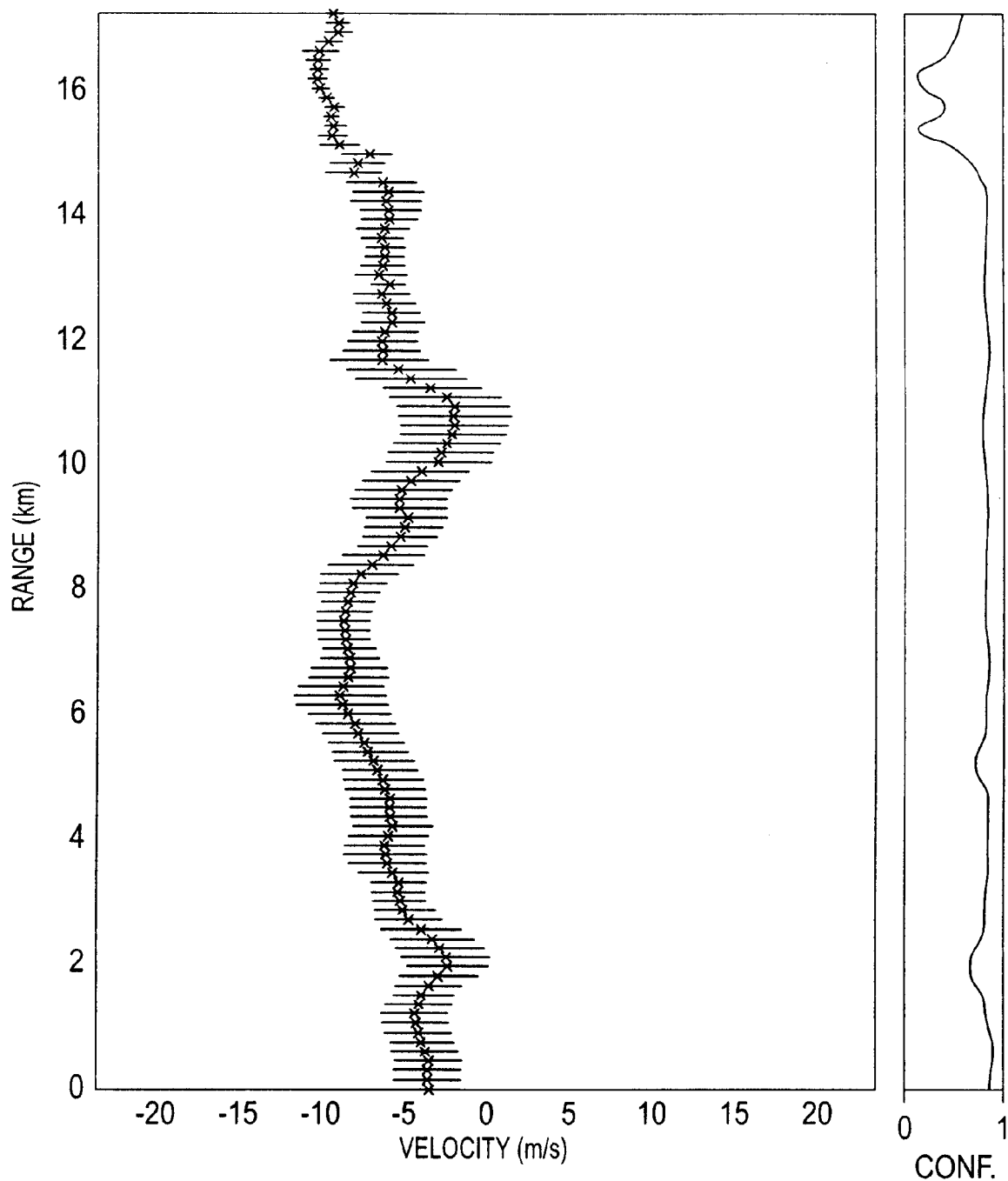
FIG. 12 illustrates moment calculations after re-estimations of moments based on range continuity for NESPA in an example of the invention.

The key to the intelligence of the NESPA system is the novel approach in identifying those moments that could be improved with additional processing. Evaluating the confidence as a function of range or azimuth identifies those spectra whose moments need to be re-estimated. Generally, the confidence for one of the moments (usually the first moment) is used, but the confidences from all three moments could be evaluated. The far right hand side of FIG. 11 shows the confidences as a function of range for the second stage. Note the sharp drop in the confidences around 4 and 9.5 km ranges.

If the confidence as a function of range or azimuth is uniformly high or low, then the moments can be assumed to be adequate. If the confidence is lower for a subset of the ranges or azimuths, then the moments associated with that "gap" could probably be improved. A simpler method of evaluation is to re-estimate all moments that have a confidence value below a certain threshold. The disadvantage of this method is that the low confidences could be caused by spectra with low SNR's, not errors in the estimation of the moments, and hence, re-estimating these moments will not provide any improvement, and is therefore inefficient.

For the signal identification methods that use the spectrum peak, a gap in the confidences can result when a signal that is not from the scatterers of interest, or an elevated noise level has caused the wrong initial peak to be chosen. FIG. 11 shows a gap in confidence due to spurious signals. For the pulse-pair method, a secondary signal can result in a biased first moment estimate, hence a discontinuity in these moments as a function of range and/or azimuth is indicative of a problem. In either case, the "correct" peak should be close to the location for the peaks in the spectra (with high confidence moments) in nearby ranges or azimuths. New regions for the signal are identified as described in the signal identification section, and new moments and confidences are estimated with one of the methods described in the moment estimation section. Typically, only a few spectra need to have their moments re-calculated, hence more computationally sophisticated methods can be used. Moment re-estimation is only performed as time permits. So, even though the full benefit of the multistage method may not used when processing time is restricted, at a minimum, moments and confidences are available at the end of the processing period.

Evaluation of Re-Estimated Moments

Occasionally, the re-estimated moments are less desirable than the original moments because, for example, there was a large, although physically reasonable change in these moments as a function of range and/or azimuth. The confidences for the sets of moments from the current stage and the previous stage should be compared, and the moments associated with the higher confidence used. The evaluation can be performed on the confidences for each range gate separately, or for the entire gap, if the method of gap identification is used as described in the identification of spectra for moment re-estimation section. The simpler method is to always use the re-estimated moments.

Exemplary NESPA Implementation

An example implementation for a processing system with moderate computational resources is presented. NESPA in the preferred form has four stages. The basic stages and their major steps are:

1) The detectability of the signal is improved using median filtering and averaging,
2) For each range gate, the second stage initial estimation of moments is performed:
   a) The noise level is calculated using the ROI method,
   b) The signal is identified using the peak-to-noise level method,
   c) The initial moments are estimated using integration, and
   d) The confidence calculations for the moments are made as time permits,
3) As time permits, the third stage re-estimation of the moments is performed:
   a) The first moment confidences are evaluated to identify gaps as a function of range. The moments for the range gates associated with the gaps are re-estimated as time allows.

For each range gate in each gap, the remaining steps are:
   b) The signal is identified using the cutoffs from range gates around the gap in combination with the peak-to-inflection points method,
   c) Moments are re-calculated using integration,
   d) The moment re-estimation is evaluated using the confidences.
4) As time permits, for the fourth stage re-estimation of the moments, the moments that show potential for improvement based on gaps in azimuthal continuity are re-estimated using the same steps as in the third stage.

Note that many other configurations could have been chosen depending on the processing capabilities of a given Doppler measurement system.

First Stage Preprocessing

Figure 13:
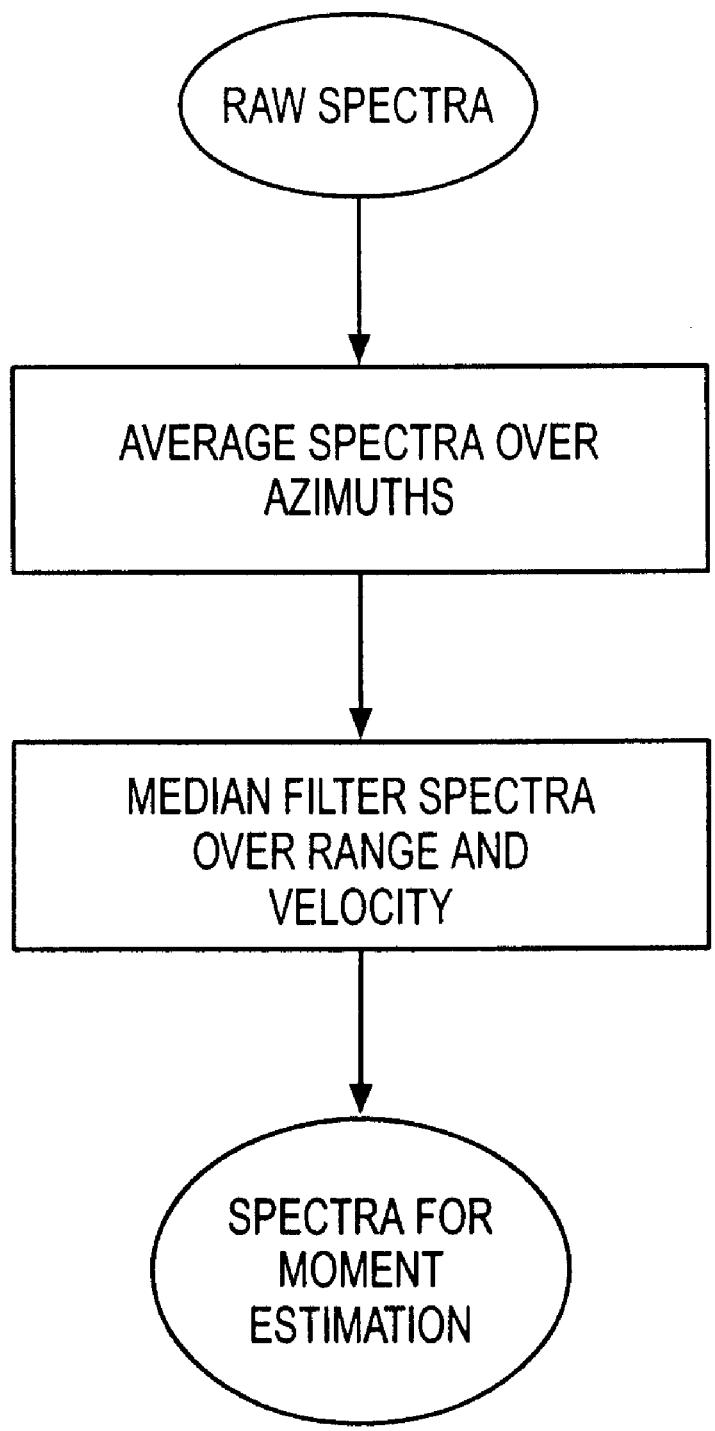
FIG. 13 illustrates a flowchart for first stage processing for NESPA in an example of the invention.

The first stage preprocessing uses averaging over azimuths and median filtering with a window in range and velocity to reduce the effects of noise and outliers on the signals in the spectra. If processing time permits, three-dimensional median filtering is preferred, using a window in azimuth, range and velocity. FIG. 13 shows the steps in preprocessing.

The number of azimuths used in averaging depends on the overlap in scattering volumes. The more azimuths that are averaged, the more the noise is reduced, but also the more the signals may be blurred. As the physical dimensions of the averaging domain increase as a function of range, the number of azimuths used may be dependent on the range. Five azimuths seem to be an adequate number for a narrow-beam (<4°) radar application. For an averaging window of size (2 aw+1), the result of the averaging for each azimuth, a, range gate, r, and velocity bin, v, is $$s_{avg}(a, r, v) = \sum_{i=\max(1,a-aw)}^{\min(A,a+aw)} s_{raw}(i, r, v)/n_g$$

where A is the last azimuth and n is the number of points in the averaging window.

For each point in the stacked spectra, (spectra arranged in a two-dimensional grid of velocity and range) median filtering works by ordering the values of the spectrum in a neighborhood of the point. The spectral value at point is replaced by the value of the middle point in the ordering. If the original spectral value was very different from its neighbors, then it will be replaced with a value that is in between the values of its neighbors. Median filtering smoothes the data and removes outliers without blurring the signal as much as averaging. The optimal size of the window for median filtering depends on the Doppler measurement system's specification. Due to concerns about smearing, systems with large separations between the center of the range gates or velocity bins will not be able to use as large of a window as systems with smaller spacing. Increasing the size of the window can filter out more noise, but it can also distort the signal. A five-by-five window seems to be adequate for radar applications. For a median filter window of size (2 rw+1) range gates and (2 vw+1) velocity bins, the result of applying the median filter to each azimuth, a, range gate, r, and velocity bin, v, is $$s(a, r, v) = \underset{\substack{j=\max(1,r-rw) \text{ to } \min(R,r+rw) \\ k=\max(1,v-vw) \text{ to } \min(V,v+vw)}}{\text{median}} s_{raw}(a, j, k),$$

where R is the last range gate and V is the last velocity bin. FIG. 7 shows the results of the averaging and median filtering for the spectra for one azimuth.

Second Stage Processing

Figure 14:
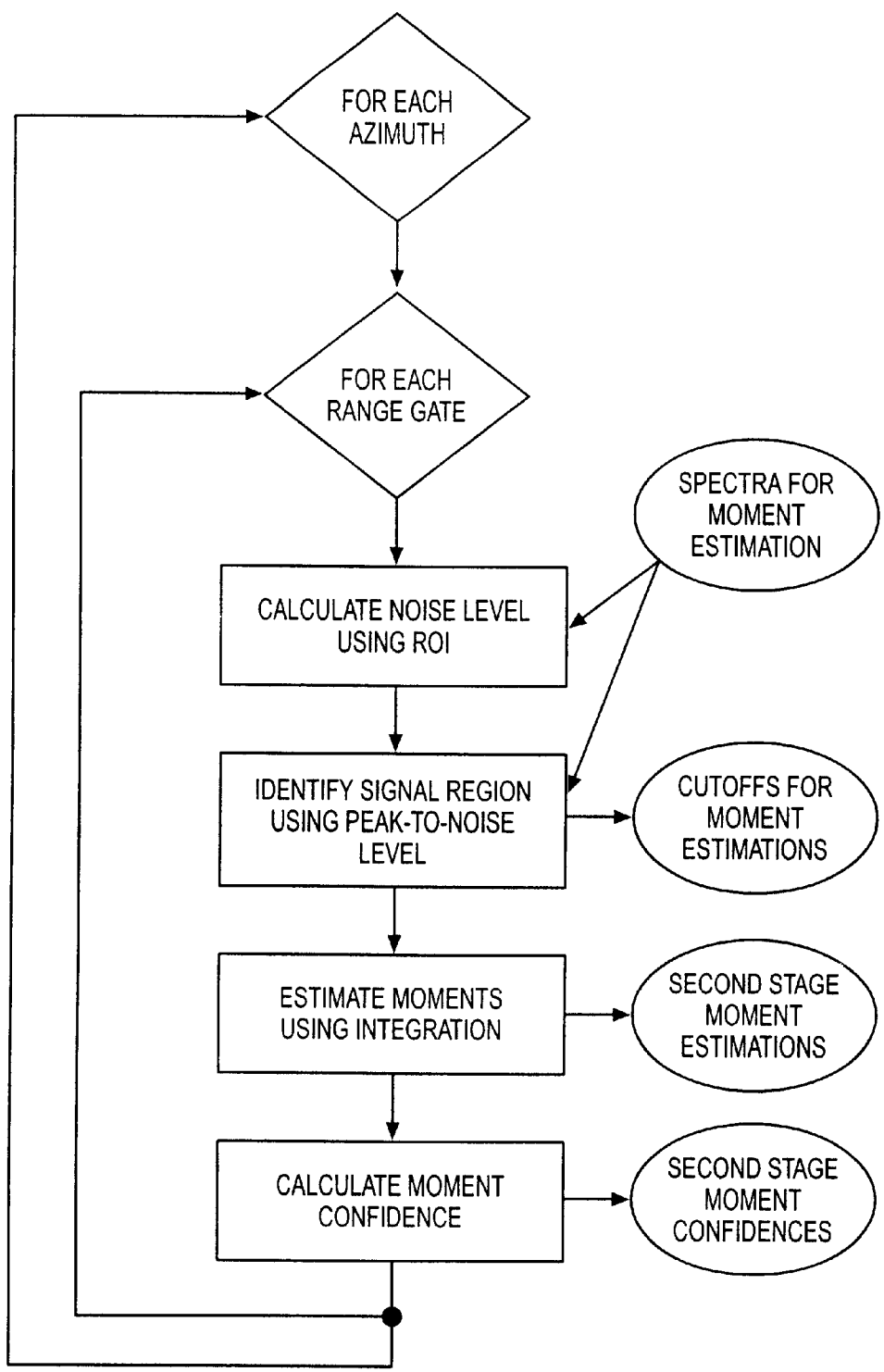
FIG. 14 illustrates a flowchart for second stage processing for NESPA in an example of the invention.
Figure 15:
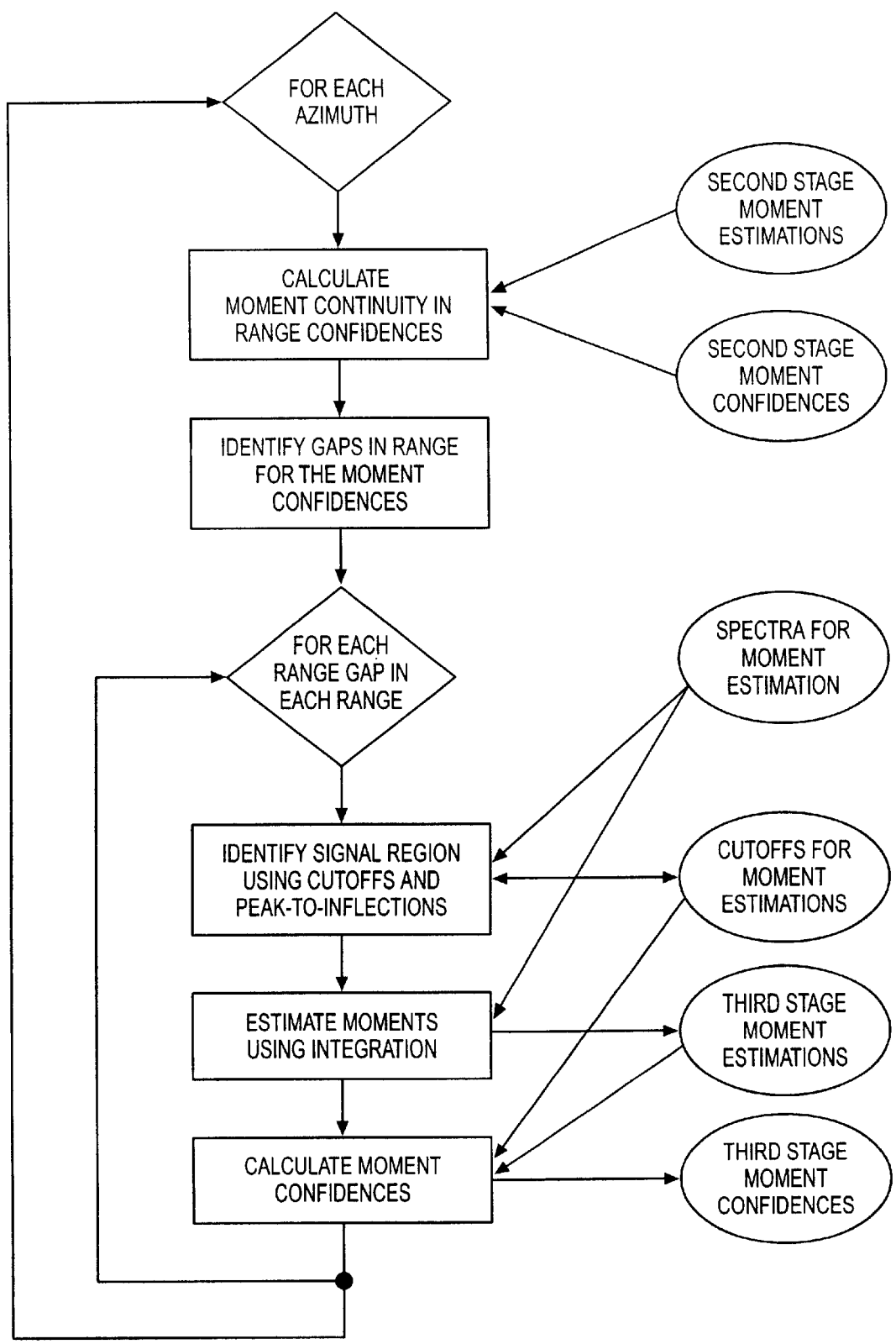
FIG. 15 illustrates a flowchart for third stage processing for NESPA in an example of the invention.

The initial moment estimation stage applies the same steps to all the spectra in all of the azimuths: noise level calculation, signal identification, moment estimation and confidence calculation (see FIG. 14). The processing steps are relatively simple so that at least one set of moments and their confidences should be estimated in the processing time allocated.

Second Stage Noise Calculation

The second stage noise calculation uses the ROI method. For each range gate, a quadratic fit is made to a window of velocity bins around each point in the spectrum. Spectral points in the signal region are expected to have higher spectral values, slopes and curvatures than points in the noise region. Membership values for the set of noise points are assigned using the spectral values, slopes and curvatures, then combined into a single membership value for each point in the spectrum, as is shown in FIG. 8b) through e). Mapping the values of the spectra, s(a, r, v), slopes, β(a, r, v), and curvatures, γ(a, r, v), to membership values is done using piecewise linear membership functions like those used for confidences, illustrated in FIG. 10. Combining the membership functions can also use the combination techniques used for confidences. In this implementation, the membership values are combined geometrically with weights of one. The mean and standard deviations for the noise level, N(a, r) and NS(a, r), at a given azimuth, a, and range gate, r, are computed using weighted averages of the spectrum, where the weights are the noise membership values at each velocity bin, $\mu(a, r, v)$, $$N(a, r) = \frac{\sum_{v=1}^{V} s(a, r, v)\mu(a, r, v)}{\sum_{v=1}^{V} \mu(a, r, v)},$$

$$NS(a, r) = \frac{\sum_{v=1}^{V} (s(a, r, v))^2 \mu(a, r, v)}{\sum_{v=1}^{V} \mu(a, r, v)} - (N(a, r))^2.$$

The noise level is generally a combination of the mean and standard deviation of the noise, $$NL(a,r) = \alpha_1 N(a,r) + \alpha_2 NS(a,r)^{1/2}.$$

For simplicity, $\alpha_1$ and $\alpha_2$ can usually be set to one.

The size of the fit window for computing the membership values depends on the size of the velocity bins. If too many points are used in the window, then the fit may not be able to finely differentiate between the signal and the noise regions. If too few points are used, then the fit will not capture the average behavior of the points and noise points could be mistaken for signal points.

Second Stage Signal Identification and Moment Estimation

The second stage signal identification is performed using the peak-to-noise level approach. The peak is found by finding the maximum of the spectrum at a given range gate. The cutoffs are determined by including each velocity bin on either side of the peak that has a spectral value that is greater than or equal to the noise level. The left cutoff, lc(a, r), is the smallest velocity bin to the left of the peak with a spectral value greater than or equal to the noise level, and the right cutoff, rc(a, r) is the largest velocity bin to the right of the peak that meets this criteria.

The second stage signal identification is done simultaneously with integration. As each velocity bin is checked around the peak, if it is above the noise level, its spectral value is added to the integration, $$M_0(a, r) = \sum_{v=lc(a,r)}^{rc(a,r)} s(a, r, v),$$

$$M_1(a, r) = \sum_{v=lc(a,r)}^{rc(a,r)} vs(a, r, v)/M_0(a, r),$$

and $$M_2(a, r) = \sum_{v=lc(a,r)}^{rc(a,r)} v^2 s(a, r, v)/M_0(a, r) - M_1^2(a, r).$$

FIG. 11 shows that this method of moment estimation works well for most of the range gates.

Second Stage Signal Confidence Calculation

The confidence for the second stage is a combination of almost all of the measures mentioned in the confidence estimation section: range-variance of the first moments, signal region size and SNR. The signal size is simply the difference between the left cutoff and the right cutoff, $$size(a,r)=rc(a,r)-lc(a,r)+1.$$

The SNR is the ratio of the zero-order moment to the noise level, $$SNR(a,r)=M_0(a,r)/NL(a,r).$$

The variance is calculated after all of the moments have been calculated for the range gates in one azimuth. The variance for the $i^{th}$ moment is the variance over a window in range of a size, (2 rw+1), that is large enough to detect outliers without being so large that the outliers are not significant in the variance calculations. For a typical scanning radar, a window of 12 range gates works well. The variance, $var_1(a, r)$ is $$var_i(a,r) = \sum_{j=\max(1,r-rw)}^{\min(R,r+rw)} j^2 M_i(a,j) - \left[\sum_{j=\max(1,r-rw)}^{\min(R,r+rw)} j M_i(a,j)\right]^2$$

The membership functions used are exponential for the variance, and piecewise linear for SNR and the signal size. The confidences are combined geometrically. FIG. 11 shows how the confidence drops when the noise level is elevated, the first moment is shifted, or the size of the signal area is decreased.

Third Stage Processing

Once the moments and confidences are estimated in the second stage, the remaining processing time is evaluated. If the processing time is allocated by azimuth, then the first and second stages will be applied to one azimuth's range gates, then the third stage will be applied to the same azimuth, if enough time remains. If the time is allocated by scans, then all the azimuths in a scan will be processed through stages one and two before time remaining time for the third stage is evaluated. In this example, the processing steps will follow those in FIG. 15: calculate continuity confidences, identify gaps in the confidences, identify signal areas, re-estimate moments and calculate confidences for the range gates in the gaps.

Third Stage Continuity Confidence

An additional confidence based on continuity measured by a quadratic curve fits to the moments as a function of range is incorporated into to the first moment confidence calculated in the second stage. This continuity confidence helps identify moments that could benefit from re-estimation. The continuity confidence is not used in the second stage because of its higher computational complexity, and the lower benefit to downstream processing.

For each range gate, the curve fit is performed using a window of moment values above and below a given range gate. The measures used in the exponential confidence membership function are the total error of the fit and the error at the range gate being evaluated. This confidence is combined with the second stage confidence geometrically.

The number of range gates used in the continuity confidence estimation depends on the expected continuity of the signal. Ten to twelve points are generally appropriate for a quadratic fit to be meaningful. If the distance between the range gates is large, a smaller window may need to be used, however, to avoid identifying changes in first moments due to shear as "bad" estimates. If the number of range gates is too small, then a linear fit is used.

Third Stage Identification of Gaps in Range in Confidence

A gap in the confidence is identified by finding the local minima and maxima of the confidence as a function of range. A local minimum is defined as a location where the difference between a given range gate's confidence and the neighboring confidence values changes from negative or zero to positive. A local maximum is defined as a location where the difference between neighboring confidence values changes from positive or zero to negative. A gap is defined as the range gates from a local minimum to the nearest local maxima in either direction. The moments in the range gates in the gap are re-estimated if the confidence value at the local minimum is sufficiently low, and the gap is not too large. The size of largest gap that will be repaired depends on the expected continuity of the moments. The available processing time is evaluated before each the spectra for the range gates in each gap are processed.

Third Stage Signal Identification

The spectra for each of the range gates in each of the gaps are re-processed for signal identification in two steps:

1) Cutoffs and noise levels are estimated from the "good" cutoffs and noise levels from the range gates on either side of the gap, then
2) The signal cutoffs are identified for the individual spectra using the peak-to-inflection-point method for the spectra bounded by the cutoffs calculated in the previous step.

The purpose of the first step is to try to direct the search for the signal away from peaks in the spectrum that are not associated with the signal.

The cutoffs and noise levels for the first step can be estimated by either doing a confidence-weighted average of the values of the cutoffs and noise levels from the range gates around the gap, or by performing a confidence-weighted quadratic curve fit to the values. The first method is faster, but the second method might produce better estimates when the first moments are changing significantly over range. With either method, the cutoffs should be modified to allow for some additional variation in signal widths. One approach is for the standard deviation of the cutoff values around the given range gate to be added to the right cutoff and subtracted from the left cutoff to increase the signal region.

For the second step of third stage signal identification, the spectrum is limited to the values between the cutoffs from the first step. The new peak is chosen within this spectrum. Inflection points in this spectrum can be determined with either the local fit parameters from the ROI noise level calculation or local minima and maxima in the spectrum. The inflection points are given membership values based on their curvature and their height above the noise level. The closer the inflection point is to the noise level, the more likely it is at the edge of the signal. The closest inflection points to the new peak with membership values above a threshold are used as the new cutoffs. If the spectrum crosses the noise level at a point closer to the peak than the nearest "good" inflection point, then that velocity bin where the spectrum crosses the noise level is used for the cutoff instead. If time permits, the signal could be interpolated to the noise level when the inflection point is well above the noise level using a Gaussian fit or local second order fits near the cutoffs.

Third Stage Moment Estimation and Confidence Calculation

Moment estimation and confidence calculation for the third stage is performed in the same manner that it was performed for the second stage, with the third stage cutoffs and noise level.

Third Stage Evaluation of the Moments

The re-estimated moments for the third stage are evaluated by comparing the moment confidences to those from the second stage. Each range gate is evaluated separately. Before proceeding to the re-estimation of the moments of the next gap, a check is made for adequate remaining processing time.

Fourth Stage Processing

Figure 16:
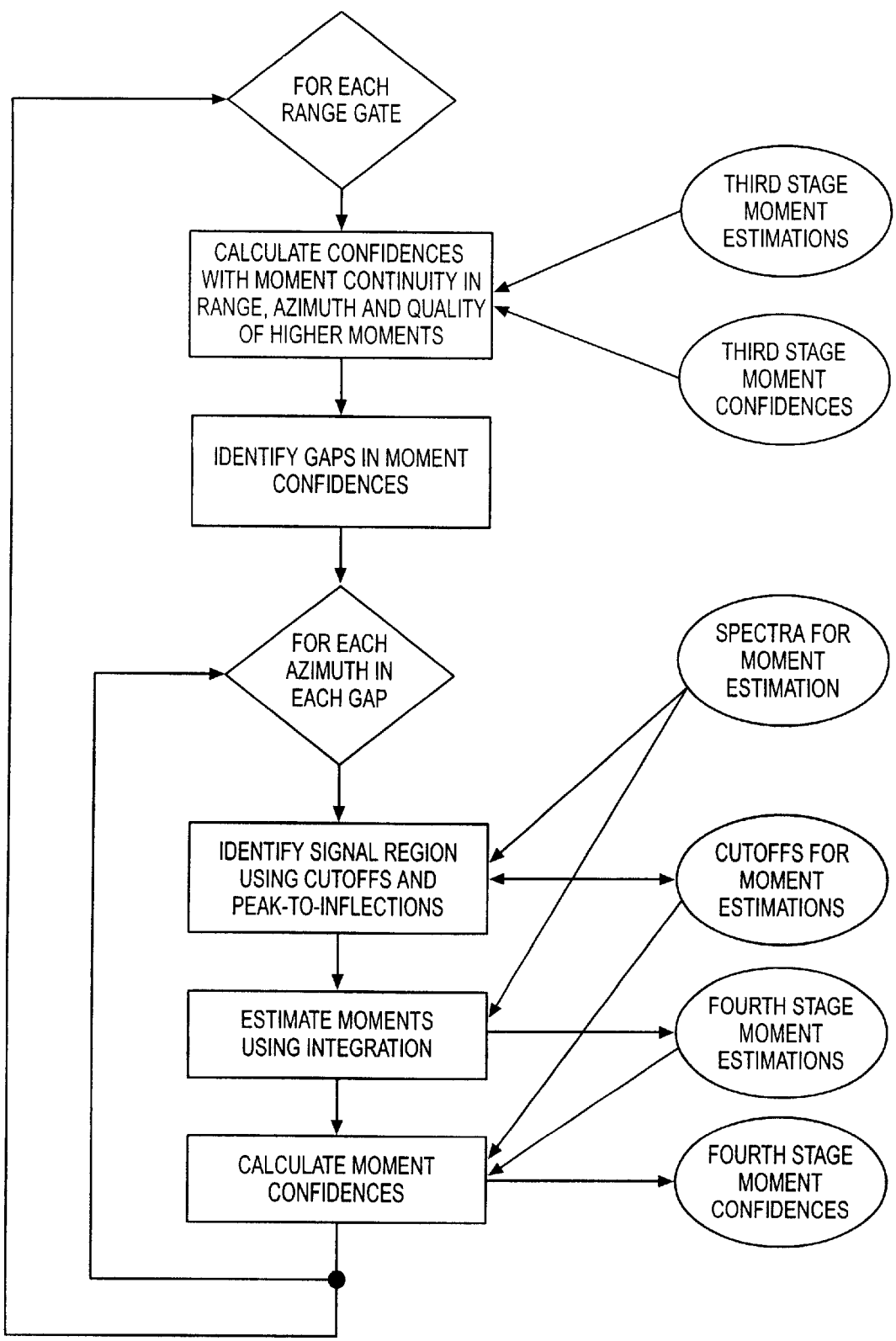
FIG. 16 illustrates a flowchart for fourth stage processing for NESPA in an example of the invention.

If processing time is still available, the fourth stage re-estimates moments in a manner that is very similar to the third stage, except the evaluation of the moments to identify gaps is performed across azimuths and ranges, and uses the third and fourth moments, too. FIG. 16 shows a flowchart of steps involved in the fourth stage:

1) calculation of a second moment continuity confidence across azimuths,
2) identification of gaps in confidence, based on continuity in a window in range and azimuth, and on the relative values of the moments which indicate the Gaussian nature of the signal,
3) identification of signals based on cutoffs and noise levels in other azimuths, moment estimation using integration, confidence calculation, and moment evaluation.

All of the azimuths must be processed through the first three stages before the fourth stage can begin. Note that the processing loops are switched from the third stage to the fourth stage. In the fourth stage, the spectra for a given range gate is evaluated over all of the azimuths.

Fourth Stage Continuity Confidence

Continuity across range and azimuths for moments would require that the first and second moments be adjusted for the motion of the Doppler measurement device (e.g. for an airborne platform), if any. For this example, the continuity confidence was calculated for the second moments, which should not vary greatly over azimuth for a given range gate and stationary platform. For a moving platform, spectra will be widened as a function of the velocity of the platform, the azimuth and the radar's azimuthal beam width. As the spectra broadens, the cut-offs will vary proportionally The continuity confidence is calculated in the same manner as in the third stage, except that the curve fit is performed over a two-dimensional window moments as a function of range and azimuth. The size of the azimuth fit window will generally be adaptable as a function of range, for example, decreasing for increasing range to maintain a relatively constant spatial window.

The confidence from the higher moments is based on the skew and kurtosis of the signal. The skewness is a ratio of the third moment to the square of the second moment. The higher this value is, the lower the confidence is. Kurtosis is the ratio of the fourth moment to the fourth power of the second moment. Large kurtosis values will also lower the confidence. The confidences from continuity, skew and kurtosis are combined geometrically.

Fourth Stage Identification of Gaps in Confidence

Where gaps occur in the confidence, re-estimations of moments are performed as time allows. The identification of gaps and allocating processing resources is performed in the same manner as for the third stage.

Fourth Stage Identification of Signals, Moment Estimation and Confidence Calculation The remaining steps of identifying the signals, estimating the moments and calculating confidences are also done in the same manner as for the third stage. The only difference is that the new cutoffs and noise levels are derived from nearby azimuths instead of nearby range gates.

Fourth Stage Evaluation of the Re-Estimated Moments

The evaluation of the quality of the moments is done using the confidences from the third and fourth stages. As in the third stage, only those re-estimated moments that show improvement are retained.

Discussion of Capabilities

The resulting system is flexible in its use of processing power. If the processing power is increased or the initial moment calculations are less intensive, then more re-estimations of moments can be made, but the emphasis is in always providing at least adequate moment estimations and associated confidences in a timely manner.

NESPA adjusts to the processing demands and capabilities. The preprocessing time depends on the number of spectra and the number of points in each spectra, which are generally fixed, plus the number of points used in the averaging and median filters, which can be varied to trade-off processing time for noise reduction. In addition to the same fixed constraints as for preprocessing, the processing time for the second stage moment region identification and estimation depends on the width of the signals in each spectra, if the peak-picking approach is used, or is fixed if the pulse-pair method is used. The processing time for the continuity confidence calculation and moment re-estimation depends on the remaining time available. The sophistication of the re-estimation can increase if more time is expected to be available. If time is not available to re-estimate the moments, then the confidences will identify those estimates as not being consistent with a "good" signal. Any downstream processing, such as hazard calculations, that uses the moments can then disregard those data.

Programmability and Adaptive Feedback

A system or apparatus that implements NESPA could be programmable. For example, various parameters could be provided through a firmware interface or through a parameter file that is read at run-time. Some of these parameters could include: size of the median filter in velocity bins and range bins, inflections points for confidence maps, size of window in range bins for continuity determination, weights for confidence functions, normalizing factors for confidence functions, thresholds for confidence functions, geometric and arithmetic parameters for combining confidence values, maximum time allowed for processing, thresholds for gap identification, padding for gaps, maximum gap size for repairs, thresholds and size limits for determining inflection points, parameters for establishing limits for re-evaluating the spectra, and a threshold for determining whether to use the repairs.

In addition to programmability, a NESPA system or apparatus could be configured with a an adaptive feedback loop. For example, many of the parameters and equations have weight factors assigned to them. A set of sample data with known moments could be input, and the weights could be adaptively modified until the calculated moments converge on the known moments. Additional sample data with associated desired outcomes could be used to tune the NESPA system or apparatus.

NESPA Circuitry and Software—FIGS. 17–20

Figure 17:
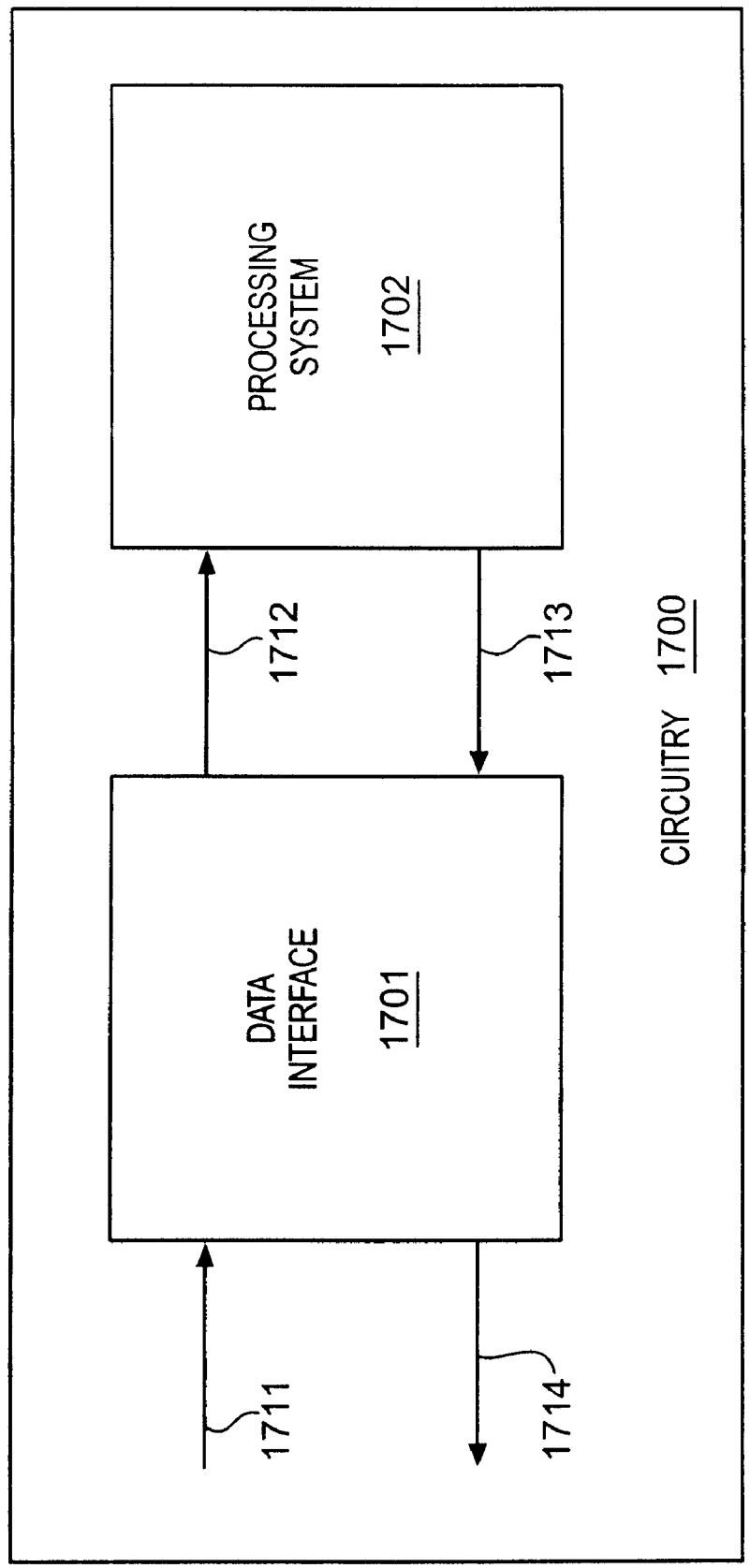
FIG. 17 illustrates circuitry in an example of the invention.

FIG. 17 illustrates circuitry 1700 in an example of the invention. Circuitry 1700 could be configured from an integrated circuit or a set of integrated circuits. Examples such integrated circuits include but are not limited to general purpose processors, digital signal processors, and application specific integrated circuits. Circuitry 1700 comprises data interface 1701 and processing system 1702. Data interface 1701 receives signal 1711 from circuitry 1700 and/or external systems. Signal 1711 indicates the information from scatterers at various ranges and pointing directions from a receiver. One example of signal 1702 is the received signal in a Doppler radar scanning system.

Data interface 1701 transfers data 1712 from signal 1711 to processing system 1702. Processing system 1702 operates as indicated with respect to FIGS. 19–20 (described below) to process data 1712 to generate moment estimations and confidence factors. Processing system 1702 transfers data 1713 indicating the moment estimations and confidence factors to data interface 1701. Data interface 1701 transfers signal 1714 indicating the moment estimations and confidence factors to circuitry 1700 and/or external systems.

Figure 18:
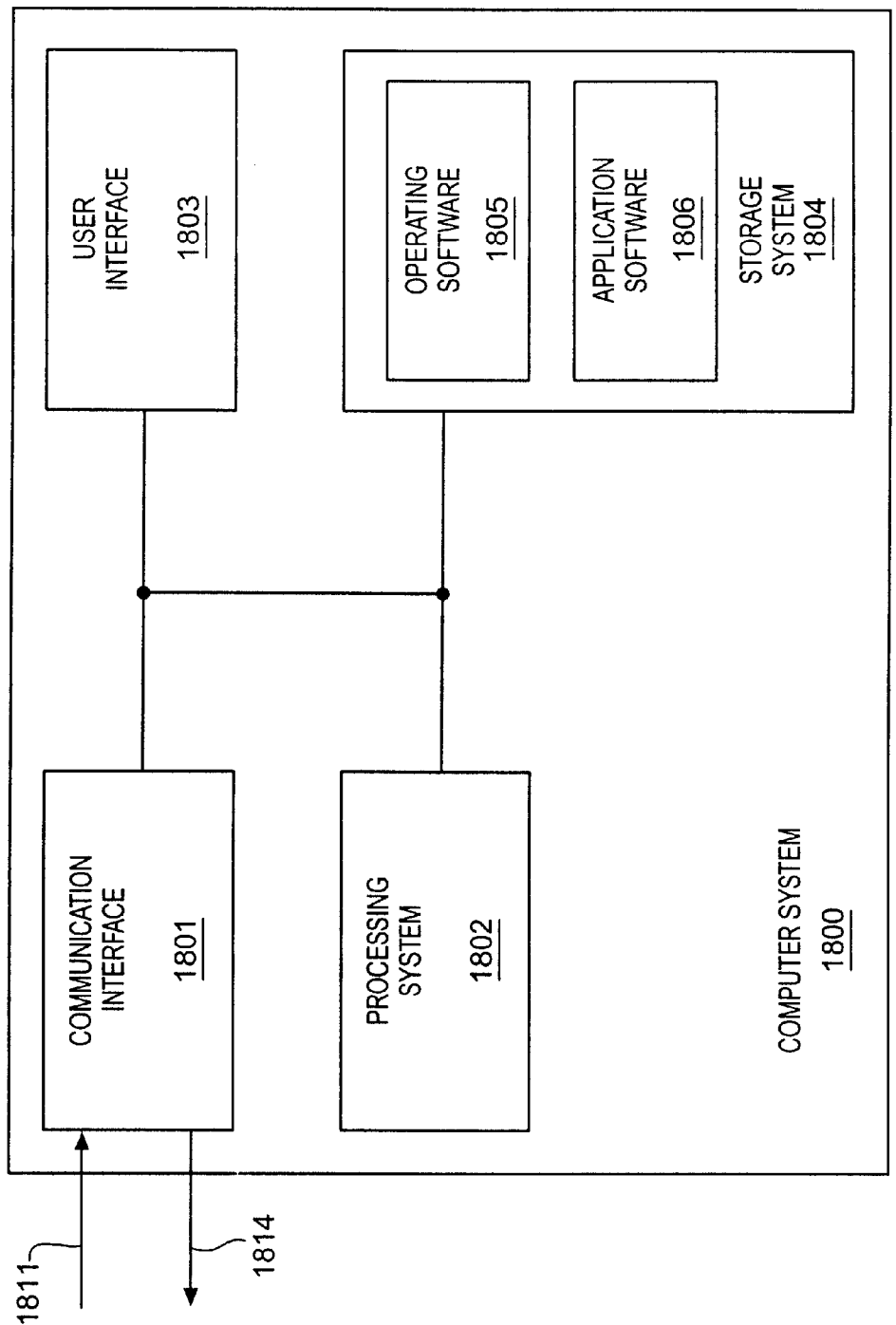
FIG. 18 illustrates a computer system and software in an example of the invention.

FIG. 18 illustrates computer system 1800 in an example of the invention. Computer system 1800 includes communication interface 1801, processing system 1802, user interface 1803, and storage system 1804. Storage system 1804 stores operating software 1805 and application software 1806. Processing system 1802 is linked to communication interface 1801, user interface 1803, and storage system 1804. Computer system 1800 could be comprised of a programmed general purpose computer, although those skilled in the art will appreciate that programmable or special purpose circuitry and equipment may be used. Computer system 1800 may use a client server architecture where operations are distributed among a server system and client devices that together comprises elements 1801–1806.

Communication interface 1801 could comprise a network interface card, modem, port, or some other communication device. Communication interface 1801 may be distributed among multiple communication devices. Processing system 1802 could comprise a computer microprocessor, logic circuit, or some other processing device. Processing system 1802 may be distributed among multiple processing devices. User interface 1803 could comprise a keyboard, mouse, voice recognition interface, microphone and speakers, graphical display, touch screen, or some other type of user device. Storage system 1804 could comprise a disk, tape, integrated circuit, server, or some other memory device. Storage system 1804 may be distributed among multiple memory devices.

Processing system 1802 retrieves and executes operating software 1805 and application software 1806 from storage system 1804. Operating software 1805 may comprise an operating system, utilities, drivers, networking software, and other software typically loaded onto a general-purpose computer. Application software 1806 could comprise an application program, firmware, or some other form of machine-readable processing instructions. When executed by processing system 1802, application software 1806 directs processing system 102 to operate in accord with FIGS. 19–20 (described below).

Processing system 1802 receives data 1811 through communication interface 1803. Data 1811 is from signals that indicate the presence of scatterers at various ranges and pointing directions from a receiver. One example of these signals is the received signals in a Doppler scanning system. Processing system 1802 processes data 1811 to generate moment estimations and confidence factors. Processing system 1802 transfers data 1814 indicating the moment estimations and confidence factors from computer system 1800 through communication interface 1801.

Figure 19:
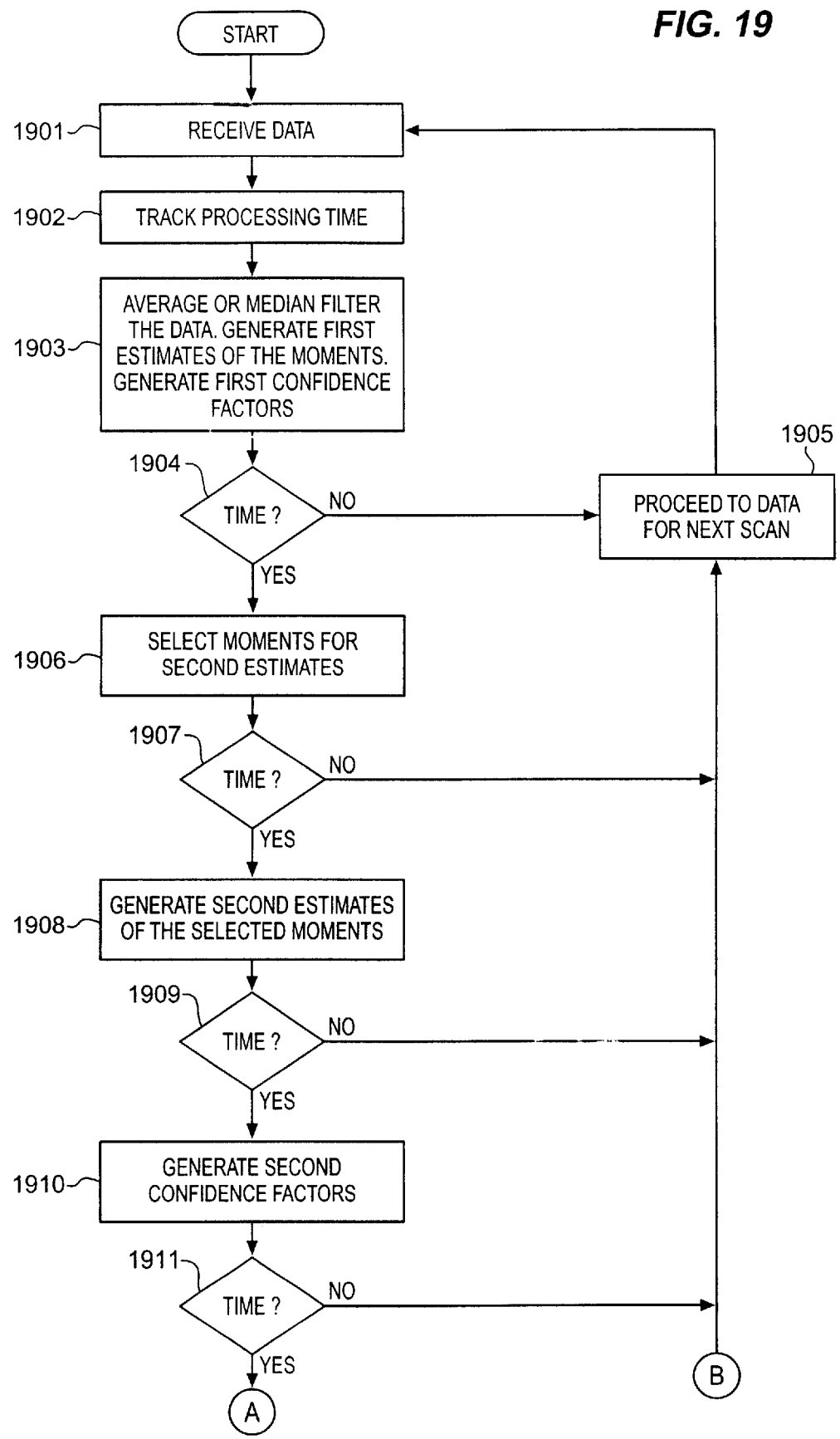
FIG. 19 illustrates processing system operation in an example of the invention.
Figure 20:
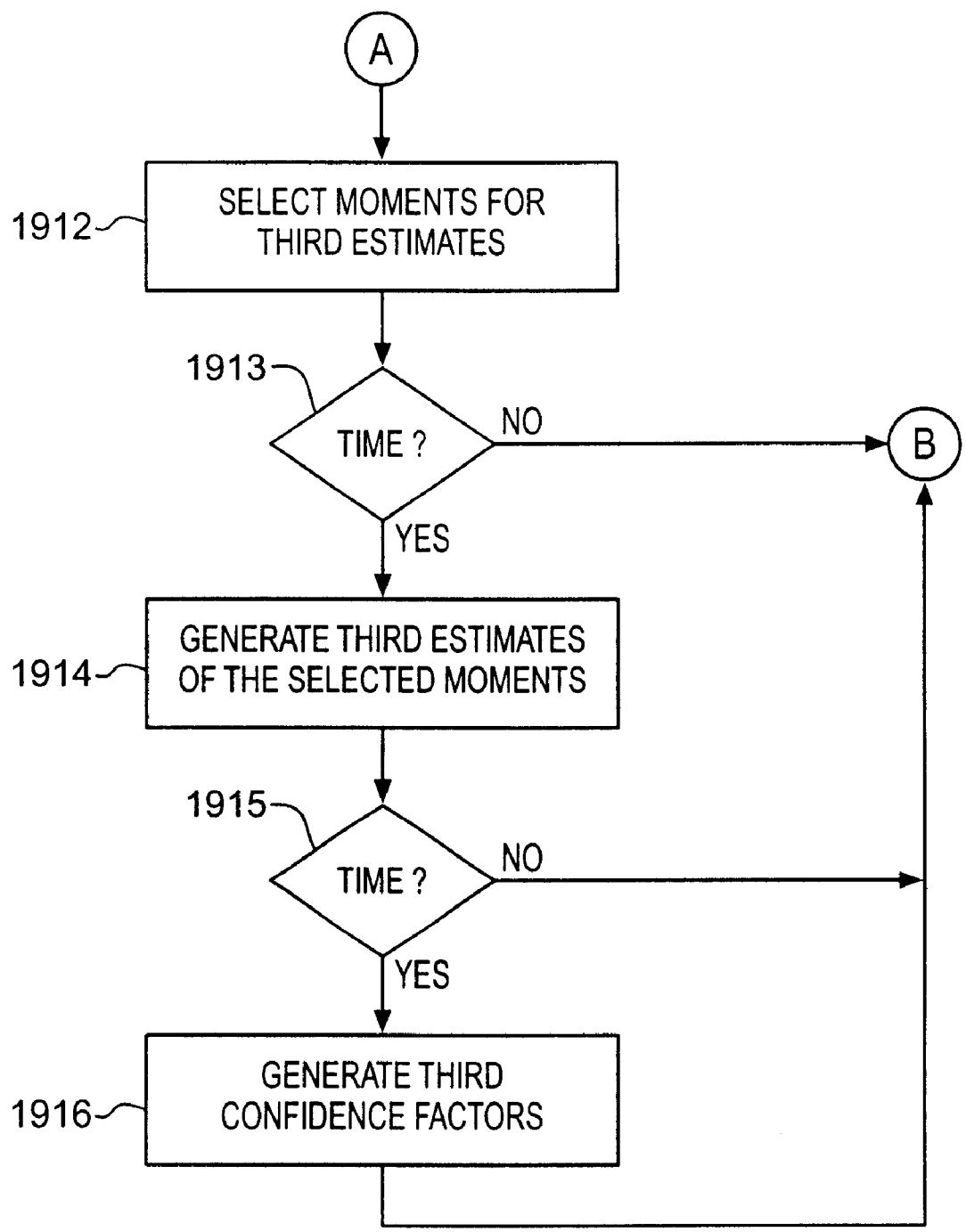
FIG. 20 illustrates processing system operation in an example of the invention.

FIGS. 19–20 illustrate operation for processing systems 1702 and 1802 in an example of the invention. The reference numbers from FIGS. 19–20 are indicated parenthetically. Before processor operation, a receiver receives signals that indicate the presence of scatterers at various ranges and pointing directions from the receiver. One example of these signals is the reflected energy from a Doppler scanning system. The processing system receives data from the signals (1901—FIG. 19). The data may be a digital representation of the received signals or additional processing, such as Fourier transformation, may be applied to the data prior to receipt.

When the data is received, the processing system tracks allowed processing time (1902). Various techniques are described above for this task. Each scan, range, azimuth, or range gate may be allotted a specific amount of time to generate final moment estimates and confidence factors. In this example, each scan of the various ranges and azimuths is allotted a specific amount of allowed processing time. If the allowed processing time does not permit additional processing, then the processing system begins to process the data from the next scan (1905).

The processing system averages and/or median filters the data to reduce noise (1903). The processing system then processes the data to generate first estimates of moments for the scatterers at the various ranges and azimuths (1903). This moment estimation process may include calculating noise levels and identifying spectral points for use in moment estimation. The processing system generates first confidence factors representing quality measures for the first estimates of the moments (1903). The first confidence factors may be generated based on consistency across the various ranges.

The processing system then checks if the allowed processing time permits additional processing (1904). Additional processing could be permitted if any processing time remains, or alternatively, if a set period of processing time remains. If the allowed processing time permits, the processing system selects moments for re-estimation based on the first confidence factors (1906). Selection may entail selecting moments that are in a gap indicated by the first confidence factors. A gap occurs when a small set of range-gates have low confidence factors, but are surrounded by range-gates with high confidence factors. For example, a "small set of range gates could be set at less than ten, and if confidence factors are between zero and one, "high" confidence factors could be set at seven or greater and "low" confidence factors could be set at four or lower. Other values or techniques could be used as desired.

The processing system then checks if the allowed processing time permits additional processing (1907). If the allowed processing time permits, the processing system generates second estimates of the selected moments (1908). This moment estimation process could include estimating noise levels and cut-offs for the gap based on calculated noise levels and cut-offs next to the gap. For example, noise levels and cut-offs for range gates next to the gap would have high confidence factors. These noise levels and cut-offs would be interpolated to provide values in the gap. This moment estimation process could also include using these estimated noise levels and cut-offs for the gap to identify spectral points for use in moment re-estimation.

The processing system then checks if the allowed processing time permits additional processing (1909). If the allowed processing time permits, the processing system generates second confidence factors representing quality measures for the second estimates of the selected moments (1910). The second confidence factors could be generated based on consistency across the various azimuths.

The processing system then checks if the allowed processing time permits additional processing (1911). If the allowed processing time permits, the processing system selects some of the moments from the second estimates based on the second confidence factors (1912—FIG. 20). The processing system then checks if the allowed processing time permits additional processing (1913). If the allowed processing time permits, the processing system generates third estimates of these selected moments (1914). The processing system then checks if the allowed processing time permits additional processing (1915). If the allowed processing time permits, the processing system generates third confidence factors (1916). This type of iterative processing could be stopped at a set number of moment estimates and confidence factors or could continue until the allowed processing time is exhausted. In this example, the third estimate is the final one, and the processing system proceeds to data from the next scan (1905).

What is claimed is:

1. A method of operating a multi-stage processing system wherein a receiver receives signals that indicate information related to scatterers, the method comprising:
    receiving data from the signals and tracking allowed processing time for the data;
    performing a first stage of processing for the data to generate first estimates of spectral moments for the signals; and
    performing additional stages of processing for the data as the allowed processing time permits and stopping the additional stages of processing for the data when the allowed processing time expires.

2. The method of claim 1 wherein the additional stages of processing comprise generating second estimates for at least some of the spectral moments.

3. The method of claim 1 wherein the signals comprise reflected energy from a Doppler scanning system.

4. A method of operating a processing system wherein a receiver receives signals that indicate information related to scatterers, the method comprising:
    receiving data from the signals;
    tracking allowed processing time;
    processing the data to generate first estimates of spectral moments for the signals;
    generating first confidence factors representing quality measures for the first estimates of the spectral moments; and
    if the allowed processing time permits, selecting selected ones of the spectral moments based on the first confidence factors and generating second estimates of the selected ones of the spectral moments.

5. The method of claim 4 further comprising averaging or median filtering the data to reduce noise.

6. The method of claim 4 wherein processing the data to generate the first estimates of the spectral moments comprises calculating noise levels.

7. The method of claim 4 wherein processing the data to generate the first estimates of the spectral moments comprises identifying spectral points for use in moment estimation.

8. The method of claim 4 wherein generating the first confidence factors comprises generating the first confidence factors based on consistency across at least one of: range, pointing direction, and time.

9. The method of claim 4 wherein selecting the selected ones of the spectral moments comprises selecting the selected ones of the spectral moments that have lower first confidence factors relative to neighboring ones of the spectral moments.

10. The method of claim 9 wherein generating the second estimates of the selected ones of the spectral moments comprises generating estimated noise levels and cut-offs for the selected ones of the spectral moments based on calculated noise levels and cut-offs for the neighboring ones of the spectral moments.

11. The method of claim 10 wherein generating the second estimates of the selected ones of the spectral moments comprises using the estimated noise levels and cut-offs to identify spectral points for use in moment re-estimation.

12. The method of claim 4 further comprising, if the allowed processing time permits, generating second confidence factors representing quality measures for the second estimates of the selected ones of the spectral moments.

13. The method of claim 12 wherein generating the second confidence factors comprises generating the second confidence factors based on consistency across at least one of: range, pointing direction, and time.

14. The method of claim 12 further comprising, if the allowed processing time permits, generating third estimates of some of the selected ones of the spectral moments based on the second confidence factors.

15. The method of claim 4 wherein the signals comprise reflected energy from a Doppler scanning system.

16. A moment estimation system wherein a receiver receives signals that indicate information related to scatterers, the moment estimation system comprising:
    an interface configured to receive data from the signals; and
    a multi-stage processing system configured to track allowed processing time for the data, perform a first stage of processing for the data to generate first estimates of spectral moments for the signals, perform additional stages of processing for the data as the allowed processing time permits, and stop the additional stages of processing for the data when the allowed processing time expires.

17. The moment estimation system of claim 16 wherein the additional stages of processing comprise generating second estimates for at least some of the spectral moments.

18. The moment estimation system of claim 16 wherein the signals comprise reflected energy from a Doppler scanning system.

19. A moment estimation system wherein a receiver receives signals that indicate information related to scatterers, the moment estimation system comprising:
    an interface configured to receive data from the signals; and
    a processing system configured to track allowed processing time, process the data to generate first estimates of spectral moments for the signals, generate first confidence factors representing quality measures for the first estimates of the spectral moments, and if the allowed processing time permits, select selected ones of the spectral moments based on the first confidence factors and generate second estimates of the selected ones of the spectral moments.

20. The moment estimation system of claim 19 wherein the processing system is configured to average or median filter the data to reduce noise.

21. The moment estimation system of claim 19 wherein the processing system is configured to calculate noise levels.

22. The moment estimation system of claim 19 wherein the processing system is configured to identify spectral points for use in moment estimation.

23. The moment estimation system of claim 19 wherein the processing system is configured to generate the first confidence factors based on consistency across at least one of: range, pointing direction, and time.

24. The moment estimation system of claim 19 wherein the processing system is configured to select the selected ones of the spectral moments that have lower first confidence factors relative to neighboring ones of the spectral moments.

25. The moment estimation system of claim 24 wherein the processing system is configured to generate estimated noise levels and cut-offs for the selected ones of the spectral moments based on calculated noise levels and cut-offs for the neighboring ones of the spectral moments.

26. The moment estimation system of claim 25 wherein the processing system is configured to use the estimated noise levels and cut-offs to identify spectral points for use in moment re-estimation.

27. The moment estimation system of claim 19 wherein the processing system is configured to generate second confidence factors representing quality measures for the second estimates of the selected ones of the spectral moments if the allowed processing time permits.

28. The moment estimation system of claim 27 wherein the processing system is configured to generate the second confidence factors based on consistency across consistency across at least one of: range, pointing direction, and time.

29. The moment estimation system of claim 27 wherein the processing system is configured to generate third estimates of some of the selected ones of the spectral moments based on the second confidence factors if the allowed processing time permits.

30. The moment estimation system of claim 19 wherein the signals comprise reflected energy from a Doppler scanning system.

31. A software product for moment estimation wherein a receiver receives signals that indicate information related to scatterers, the software product comprising:

multi-stage processing software configured to direct a processing system to receive data from the signals, track allowed processing time for the data, perform a first stage of processing for the data to generate first estimates of spectral moments for the signals, perform additional stages of processing for the data as the allowed processing time permits, and stop the additional stages of processing for the data when the allowed processing time expires; and a storage system that stores the multi-stage processing software.

32. The software product of claim 31 wherein the additional stages of processing comprise generating second estimates for at least some of the spectral moments.

33. The software product of claim 31 wherein the signals comprise reflected energy from a Doppler scanning system.

34. A software product for moment estimation wherein a receiver receives signals that indicate information related to scatterers, the software product comprising:

software configured to direct a processing system to receive data from the signals, track allowed processing time, process the data to generate first estimates of spectral moments for the signals, generate first confidence factors representing quality measures for the first estimates of the spectral moments, and if the allowed processing time permits, select selected ones of the spectral moments based on the first confidence factors and generate second estimates of the selected ones of the spectral moments; and a storage system that stores the software.

35. The software product of claim 34 wherein the software is configured to direct the processing system to average or median filter the data to reduce noise.

36. The software product of claim 34 wherein the software is configured to direct the processing system to calculate noise levels.

37. The software product of claim 34 wherein the software is configured to direct the processing system to identify spectral points for use in moment estimation.

38. The software product of claim 34 wherein the software is configured to direct the processing system to generate the first confidence factors based on consistency across at least one of: range, pointing direction, and time.

39. The software product of claim 34 wherein the software is configured to direct the processing system to select the selected ones of the spectral moments that have lower first confidence factors relative to neighboring ones of the spectral moments.

40. The software product of claim 39 wherein the software is configured to direct the processing system to generate estimated noise levels and cut-offs for the selected ones of the spectral moments based on calculated noise levels and cut-offs for the neighboring ones of the spectral moments.

41. The software product of claim 40 wherein the software is configured to direct the processing system to use the estimated noise levels and cut-offs to identify spectral points for use in moment re-estimation.

42. The software product of claim 34 wherein the software is configured to direct the processing system to generate second confidence factors representing quality measures for the second estimates of the selected ones of the spectral moments if the allowed processing time permits.

43. The software product of claim 42 wherein the software is configured to direct the processing system to generate the second confidence factors based on consistency across at least one of: range, pointing direction, and time.

44. The software product of claim 42 wherein the software is configured to direct the processing system to generate third estimates of some of the selected ones of the spectral moments based on the second confidence factors if the allowed processing time permits.

45. The software product of claim 34 wherein the signals comprise reflected energy from a Doppler scanning system.

* * * * *